United States Patent
Anderson et al.

(10) Patent No.: US 9,961,026 B2
(45) Date of Patent: May 1, 2018

(54) CONTEXT-BASED MESSAGE CREATION VIA USER-SELECTABLE ICONS

(71) Applicant: Intel Corporation, Santa Clara, CA (US)

(72) Inventors: Glen J. Anderson, Beaverton, OR (US); Ryan S. Brotman, Hillsboro, OR (US); Wen-Ling M. Huang, Los Altos, CA (US); Francisco Javier Fernandez, Portland, OR (US); Jamie Sherman, Portland, OR (US); Deepak S. Vembar, Portland, OR (US); Philip Muse, Folsom, CA (US); Lenitra M. Durham, Beaverton, OR (US); Pete A. Denman, Porland, OR (US); Giuseppe Beppe Raffa, El Cerrito, CA (US); Ramune Nagisetty, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/355,291

(22) PCT Filed: Oct. 31, 2013

(86) PCT No.: PCT/US2013/067743
§ 371 (c)(1),
(2) Date: Apr. 30, 2014

(87) PCT Pub. No.: WO2015/065424
PCT Pub. Date: May 7, 2015

(65) Prior Publication Data
US 2015/0222576 A1 Aug. 6, 2015

(51) Int. Cl.
*G06F 3/00* (2006.01)
*G06Q 10/10* (2012.01)
(Continued)

(52) U.S. Cl.
CPC ............. *H04L 51/046* (2013.01); *G06F 1/16* (2013.01); *G06F 1/163* (2013.01); *G06F 3/048* (2013.01);
(Continued)

(58) Field of Classification Search
None
See application file for complete search history.

(56) References Cited

U.S. PATENT DOCUMENTS 5,299,125 A * 3/1994 Baker .................... G09B 21/00
434/112
2005/0081150 A1 4/2005 Beardow
(Continued)

FOREIGN PATENT DOCUMENTS

JP 2011-198323 A 10/2011
KR 10-2009-0104987 A 10/2009
(Continued)

OTHER PUBLICATIONS

International Search Report and Written Opinion received for International Application No. PCT/US2013/067743, dated Jul. 30, 2014, 10 pages.
(Continued)

*Primary Examiner* — Mahelet Shiberou
(74) *Attorney, Agent, or Firm* — Barnes & Thornburg LLP

(57) ABSTRACT

Technologies for generating a text message from user-selectable icons include a wearable computing device that determines a context associated with the wearable computing device. The wearable computing device determines user-selectable icons from predetermined user-selectable icons based on the context associated with the wearable computing device. Each of the user-selectable icons may have one or more textual meanings associated therewith for (Continued)

text message generation. The determined user-selectable icons may be displayed on a display of the wearable computing device.

22 Claims, 14 Drawing Sheets

(51) Int. Cl.
| | |
|---|---|
| H04L 12/58 | (2006.01) |
| G06F 1/16 | (2006.01) |
| G06F 9/44 | (2018.01) |
| G06F 3/048 | (2013.01) |
| G06F 3/0481 | (2013.01) |
| G06F 3/0482 | (2013.01) |
| G06F 3/0484 | (2013.01) |
| G06F 17/30 | (2006.01) |
| G06F 3/0488 | (2013.01) |

(52) U.S. Cl.
CPC ......... *G06F 3/0482* (2013.01); *G06F 3/0488* (2013.01); *G06F 3/04817* (2013.01); *G06F 3/04842* (2013.01); *G06F 9/44* (2013.01); *G06F 9/4443* (2013.01); *G06F 17/30867* (2013.01)

(56) References Cited

U.S. PATENT DOCUMENTS

| | | | |
|---|---|---|---|
| 2005/0268251 A1 | 12/2005 | Bennetts et al. | |
| 2008/0216022 A1* | 9/2008 | Lorch | G06F 3/04817 715/847 |
| 2009/0051649 A1 | 2/2009 | Rondel | |
| 2010/0229082 A1 | 9/2010 | Karmarkar et al. | |
| 2013/0103766 A1* | 4/2013 | Gupta | G06Q 10/107 709/206 |
| 2013/0111342 A1* | 5/2013 | Alameh | G06F 3/0488 715/702 |
| 2013/0159919 A1* | 6/2013 | Leydon | G06F 3/0236 715/780 |
| 2014/0092130 A1 | 4/2014 | Anderson et al. | |
| 2014/0181715 A1* | 6/2014 | Axelrod | G06F 3/0487 715/771 |
| 2014/0237425 A1* | 8/2014 | Chan | G06F 3/0482 715/810 |
| 2014/0245177 A1* | 8/2014 | Maklouf | G06F 3/04886 715/752 |

FOREIGN PATENT DOCUMENTS

| | | |
|---|---|---|
| KR | 10-2011-0078008 A | 7/2011 |
| KR | 10-2012-0124206 A | 11/2012 |
| KR | 10-1233955 B1 | 2/2013 |
| WO | 2013024266 A2 | 2/2013 |
| WO | 2013148596 A2 | 10/2013 |

OTHER PUBLICATIONS

Wikipedia.org, "Google Glass," Wikipedia, The Free Encyclopedia, retrieved from: <http://en.wikipedia.org/w/index.php?title=Google_Glass&oldid=574226895>, edited Sep. 23, 2013, 5 pages.
Wikipedia.org, "Haptic technology," Wikipedia, The Free Encyclopedia, retrieved from: <http://en.wikipedia.org/w/index.php?title=Haptic_technology&oldid=573981950>, edited Sep. 22, 2013, 5 pages.
Wikipedia.org, "Optical head-mounted display," Wikipedia, The Free Encyclopedia, retrieved from: <http://en.wikipedia.org/w/index.php?title=Optical_head-mounted_display&oldid=573868619>, edited Sep. 21, 2013, 14 pages.
Wikipedia.org, "Wearable computer," Wikipedia, The Free Encyclopedia, retrieved from: <http://en.wikipedia.org/w/index.php?title=Wearable_computer&oldid=573111707>, edited Sep. 16, 2013, 9 pages.
Wikipedia.org, "Somatosensory system," Wikipedia, The Free Encyclopedia, retrieved from: <http://en.wikipedia.org/w/index.php?title=Somatosensory_system&oldid=569866521>, edited Aug. 23, 2013, 6 pages.
U.S. Appl. No. 13/992,915, filed Jun. 10, 2013, 30 pages.
PCT International Application No. PCT/US2013/041404, May 16, 2013, 63 pages.
European Search Report for Patent Application No. 13896490.3-1879, dated Aug. 6, 2017, 7 pages.
Japanese Office Action and English Translation for Patent Application No. 2016-516938, dated May 16, 2017, 6 pages.
Notice of Preliminary Rejection for Korean Patent Application No. 9-5-2017-011702960, dated Feb. 2, 2017, 10 pages.

\* cited by examiner

| ICON(S) | TEXTUAL MEANING | LOCATION: HOME | LOCATION: WORK | RECIPIENT: FRIEND | RECIPIENT: COLLEAGUE |
|---|---|---|---|---|---|
| ICON_1 | MEANING_A | 0.6 | 0.1 | 0.1 | 0.2 |
| ICON_2 | MEANING_A | 0.2 | 0.4 | 0.2 | 0.2 |
| ICON_2 | MEANING_B | 0.7 | 0.1 | 0.1 | 0.1 |
| ICON_3 | MEANING_A | 0.9 | 0.0 | 0.1 | 0.0 |
| ICON_4 | MEANING_A | 0.1 | 0.2 | 0.3 | 0.4 |
| ICON_5 | MEANING_A | 0.4 | 0.3 | 0.1 | 0.2 |
| ICON_6 | MEANING_A | 0.1 | 0.4 | 0.5 | 0.0 |
| ICON_7 | MEANING_A | 0.1 | 0.5 | 0.4 | 0.0 |
| ICON_8 | MEANING_A | 0.0 | 1.0 | 0.0 | 0.0 |
| ICON_9 | MEANING_A | 0.6 | 0.2 | 0.1 | 0.1 |
| ICON_10 | MEANING_A | 0.2 | 0.2 | 0.4 | 0.2 |
| ICON_11 | MEANING_A | 0.1 | 0.8 | 0.1 | 0.0 |

FIG. 5

CONTEXT-BASED MESSAGE CREATION VIA USER-SELECTABLE ICONS

CROSS REFERENCE TO RELATED APPLICATIONS

This application is a national stage entry under 35 USC § 371(b) of International Application No. PCT/US2013/067743, which was filed Oct. 31, 2013.

BACKGROUND

Mobile computing devices are becoming ubiquitous tools for personal, business, and social uses. The portability of mobile computing devices is increasing as the size of the devices decrease and processing power increases. In fact, many computing devices are sized to be hand-held and/or worn by the user to improve ease of use. Additionally, modern mobile computing devices are equipped with increased processing power and data storage capability to allow such devices to perform advanced processing. Further, many modern mobile computing devices are capable of connecting to various data networks, including the Internet, to retrieve and receive data communications over such networks. As such, modern mobile computing devices are powerful, often personal, tools untethered to a particular location.

To facilitate portability, many mobile computing devices include touchscreen displays of limited size to thereby decrease the overall size of the device. However, the small display size of mobile computing devices may create difficulties for users in performing certain functions on the mobile computing device. For example, generating text messages on a wrist-based electronic device (e.g., a smart watch) can be cumbersome and difficult due to the relatively small size of the touchscreen display and the virtual keyboard provided thereon.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 5 is an illustrative embodiment of a policy database that may be utilized by the wearable computing device of FIG. 1 to determine the user-selectable icons to display;

DETAILED DESCRIPTION OF THE DRAWINGS

Figure 1:
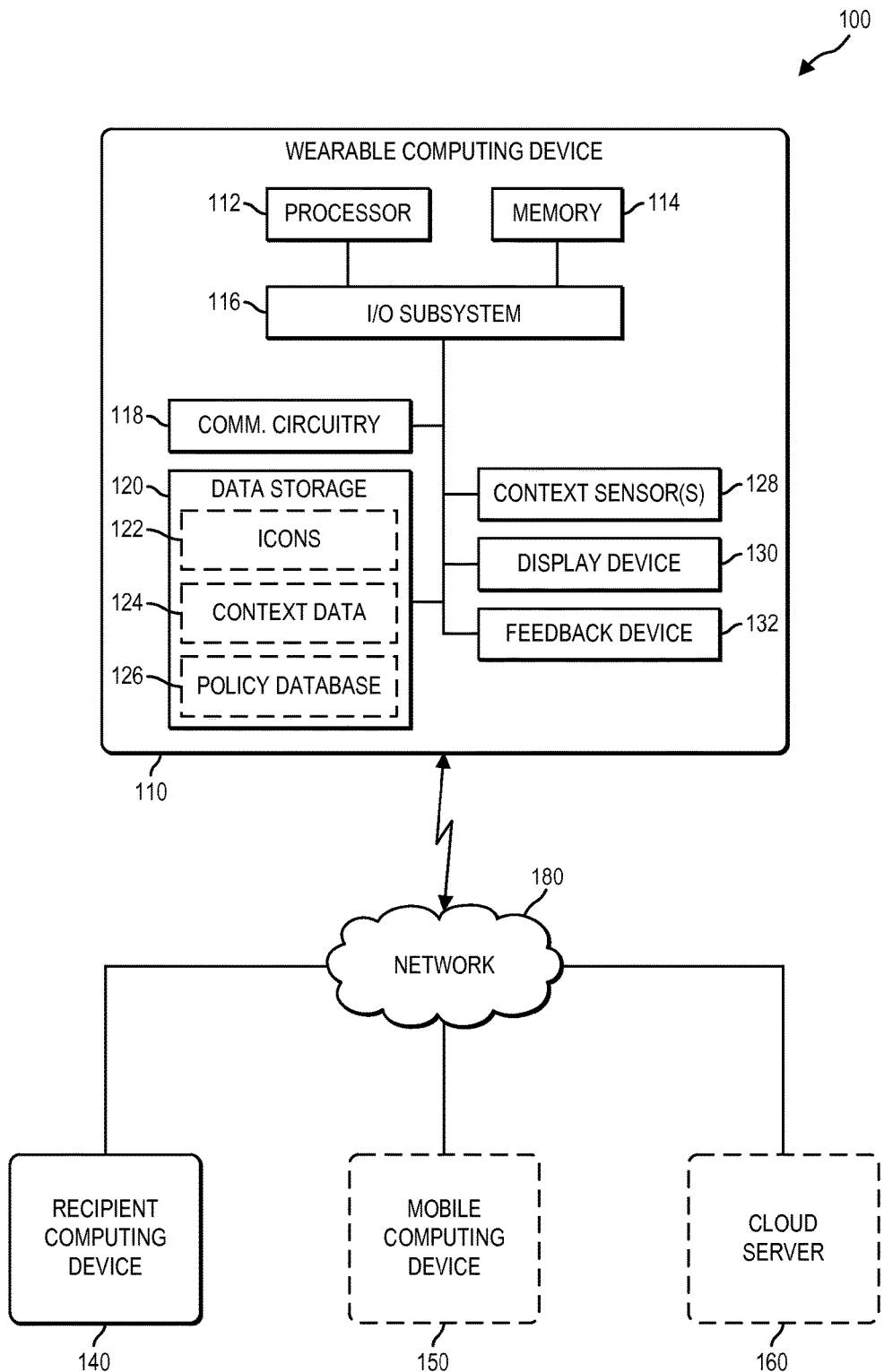
FIG. 1 is a simplified block diagram of at least one embodiment of a system for generating a text message from user-selectable icons displayed on a wearable computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for generating a text message from user-selectable icons 122 includes a wearable computing device 110 and a recipient computing device 140, which communicate with each other over a network 180. In use, a user may operate the wearable computing device 110 to generate a text message based on selection of the user-selectable icons 122 and transmit the generated text message to the recipient computing device 140 (or other device) over the network 180. To facilitate the generation of the text message, the wearable computing device 110 is configured to determine a context associated with the wearable computing device 110 and determine one or more user-selectable icons 122 to display for user selection based on that context. The user-selectable icons 122 may be displayed on the wearable computing device 110 in any suitable format (e.g., in a row, column, quadrants, etc.) depending on, for example, the shape and size of the wearable computing device. In some embodiments, the context associated with the wearable computing device 110 may be embodied as the context of the wearable computing device 110 itself, the context of a user of the wearable computing device 110, or a combination thereof. Each of the user-selectable icons 122 may have one or more textual meanings associated therewith, which may be previously supplied by the user in some embodiments. As discussed in more detail below, each textual meaning may be embodied as one or more characters (e.g., a single character, a string of characters, a phrase, a word, etc.) that may be retrieved, in response to selection thereof, and used to generate a text message (e.g., a short message service message, an email message, a web address, a username, a password, a social media post, a social media status update, a chat message, a group text message, etc.) or a portion thereof.

Additionally or alternatively, one or more of the user-selectable icons 122 may have one or more functions of the wearable computing device 110 associated therewith. In such embodiments, the wearable computing device 110 may be configured to perform the one or more functions in response to selection of the associated user-selectable icon(s) 122. In operation, as the context associated with the wearable computing device 110 changes, so too does the particular user-selectable icons 122 that are displayed to the user for selection. For example, in some embodiments, the wearable computing device 110 is configured to change the particular user-selectable icons 122 displayed based at least in part on, or otherwise as a function of, the location of the wearable computing device 110, an activity of a user of the wearable computing device 110, a particular recipient of the text message, a particular user-selectable icon 122 selected by the user, the time of day the text message is being created, and/or any context associated with the wearable computing device 110 suitable for displaying contextually relevant user-selectable icons 122 to the user.

As mentioned above, the wearable computing device 110 is configured to generate a text message based on the selection of one or more of the displayed user-selectable icons 122. To do so, the wearable computing device 110 receives a selection of one or more user-selectable icons 122 and retrieves the textual meaning associated therewith. In some embodiments, the wearable computing device 110 is configured to display one or more user-selectable sub-icons (e.g., related icons) in response to the selection of a user-selectable icon 122. In embodiments wherein more than one user-selectable icon 122 is selected by the user, the wearable computing device 110 is configured to combine (e.g., concatenate, aggregate, etc.) the textual meaning associated with each selected user-selectable icon 122 to generate the text message. The generated text message may be transmitted to the recipient computing device 140, the mobile computing device 150, and/or the cloud server 160.

The wearable computing device 110 may be embodied as, or otherwise include, any type of computing device configured to be worn, or otherwise carried, by a user and capable of performing the functions described herein including, but not limited to, a wrist-based computing device, a smart watch, an optical head-mounted display, a mobile computing device, a mobile phone, a smart phone, a tablet computing device, a personal digital assistant, a consumer electronic device, a laptop computing device, a desktop computer, and/or other type of computing device. For example, as illustratively shown in FIG. 2, the wearable computing device 110 may be embodied as a wrist-based computing device 210. Referring back to FIG. 1, the illustrative wearable computing device 110 includes a processor 112, a memory 114, an input/output (I/O) subsystem 116, communication circuitry 118, a data storage 120, one or more context sensors 128, a display device 130, and a feedback device 132. Of course, the wearable computing device 110 may include other or additional components, such as those commonly found in a computer (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 112 in some embodiments.

The processor 112 may be embodied as any type of processor capable of performing the functions described herein. For example, the processor 112 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the wearable computing device 110 such as operating systems, applications, programs, libraries, and drivers. The memory 114 is communicatively coupled to the processor 112 via the I/O subsystem 116, which may be embodied as circuitry and/or components to facilitate input/output operations with the processor 112, the memory 114, and other components of the wearable computing device 110. For example, the I/O subsystem 116 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 116 may form a portion of a system-on-a-chip (SoC) and be incorporated, along with the processor 112, the memory 114, and other components of the wearable computing device 110, on a single integrated circuit chip.

The communication circuitry 118 of the wearable computing device 110 may be embodied as any type of communication circuit, device, or collection thereof, capable of enabling communications between the wearable computing device 110 and the recipient computing device 140, the mobile computing device 150, the cloud server 160, and/or other computing devices. The communication circuitry 118 may be configured to use any one or more communication technologies (e.g., wireless or wired communications) and associated protocols (e.g., Ethernet, Wi-Fi®, WiMAX, etc.) to effect such communication.

The data storage 120 may be embodied as any type of device or devices configured for short-term or long-term storage of data such as, for example, memory devices and circuits, memory cards, hard disk drives, solid-state drives, or other data storage devices. In some embodiments, the data storage 120 may be configured to store one or more user-selectable icons 122. Each of the user-selectable icons 122 may be embodied as a visual character and/or graphic configured to be displayed to the user. As discussed in more detail below, the wearable computing device 110 may select one or more of the user-selectable icons 122 based at least in part on, or otherwise as a function of, the context associated with the wearable computing device 110. In some embodiments, the data storage 120 is configured to store a plurality of user-selectable icons 122. In such embodiments, the plurality of user-selectable icons 122 stored in the storage device 120 define a global set of user-selectable icons 122 from which a particular subset and/or group of the user-selectable icons 122 may be selected for display by the wearable computing device 110.

Additionally, in some embodiments, the data storage 120 may also be configured to store context data 124 indicative of a context associated with the wearable computing device 110. For example, in some embodiments, the context data 124 may include context data 124 indicative of the context of the wearable computing device 110 itself, context data 124 indicative of the user of the wearable computing device 110, or a combination thereof. As discussed in more detail below, the context data 124 may be embodied as context data 124 associated with a current context associated with the wearable computing device 110 and/or historical context data associated with a past context associated with the wearable computing device 110. The data storage 120 may also be configured to store a policy database 126. As discussed in more detail below, each of the user-selectable icons 122 may have one or more textual meanings associated therewith. It should be appreciated that the user's interpretation and/or usage of a particular user-selectable icon 122 may change based at least in part on the context associated with the wearable computing device 110. As such, the policy database 126 may include one or more rules for determining one or more of the user-selectable icons 122 to display to the user based on the context associated with the wearable computing device 110. Additionally or alternatively, the policy database 126 may include probability data computed for each of the user-selectable icons 122 to facilitate the determination of which user-selectable icons 122 should be displayed to the user at a given time. For example, the probability data for a particular user-selectable icon 122 may be indicative of the probability that the user-selectable icon 122 will be selected (or has been historically selected) by the user based on one or more reference contexts.

The context sensor(s) 128 may be embodied as any type of device or devices configured to capture context data indicative of a context of the wearable computing device 110 and/or the user of the wearable computing device 110. As such, the context sensor(s) 128 sense characteristics of the user and/or information corresponding to the operating environment of the wearable computing device 110. For example, in some embodiments, the context sensor(s) 128 may be embodied as, or otherwise include, one or more biometric sensors configured to sense physical attributes (e.g., facial features, speech patterns, retinal patterns, etc.), behavioral characteristics (e.g., eye movement, visual focus, body movement, etc.), and/or expression characteristics (e.g., happy, sad, smiling, frowning, sleeping, surprised, excited, pupil dilation, etc.) of one or more users of the wearable computing device 110. In some embodiments, the context sensor(s) 128 may also include or be embodied as one or more camera sensors (e.g., cameras) configured to capture digital images and/or video of one or more users of the wearable computing device 110. For example, the context sensor(s) 128 may be embodied as one or more still camera sensors (e.g., cameras configured to capture still photographs) and/or one or more video camera sensors (e.g., cameras configured to capture moving images in a plurality of frames). In such embodiments, the digital images captured by the one or camera sensors may be analyzed to detect one or more physical attributes, behavioral characteristics, and or expression characteristics of one or more users of the wearable computing device 110. Additionally, the context sensor(s) 128 may be embodied as, or otherwise include, one or more environment sensors configured to sense environment data corresponding to the operating environment of the wearable computing device 110. For example, in some embodiments, one or more of the context sensor(s) 128 include environment sensors that are configured to sense and generate weather data, ambient light data, sound level data, location data, and/or time data corresponding to the operating environment of the wearable computing device 110. It should be appreciated that the context sensor(s) 128 may also be embodied as any other type of sensors including functionality for capturing context data indicative of the context of the wearable computing device 110 or the user of the wearable computing device 110. Additionally, although the wearable computing device 110 includes the one or more context sensors 128 in the illustrative embodiment, it should be understood that all or a portion of the context sensors 128 may be separate from the wearable computing device 110 in other embodiments.

The display device 130 may be embodied as any type of touch sensitive display device capable of performing the functions described herein. For example, the display device 130 may be embodied as any type of touch sensitive display device capable of displaying and receiving the selection of one or more user-selectable icons 122 by the user. As such, the display device 130 may include, or otherwise use, any suitable touch sensitive display technology including, for example, a liquid crystal display (LCD), a light emitting diode (LED) display, an organic light emitting diode display (OLED) a cathode ray tube (CRT) display, a plasma display, an electronic ink (e-ink) display, and/or other touch sensitive display usable in an wearable computing device 110 to display user-selectable icons 122 to the user of the wearable computing device 110 and receive a selection therefrom.

The feedback device 132 may be embodied as any type device configured to generate a visual, audible, and/or somatosensory response to alert or otherwise notify the user of the selection of one or more of the user-selectable icons 122. For example, the feedback device 132 may be embodied as a haptic device configured to produce a haptic sensation (e.g., vibration, motion, force, etc.) in response to selection by the user of one or more of the user-selectable icons 122. Additionally or alternatively, the feedback device 132 may be embodied as an external speaker configured to reproduce an alert sound or signal generated by the wearable computing device 110 in response to selection of one or more of the user-selectable icons 122. The feedback device 132 may also be embodied as a light emitting diode (LED) or any other type of indicator lamp configured to produce a visible indicator in response to selection of one or more of the user-selectable icons 122.

As discussed above, the wearable computing device 110 may communicate with the recipient computing device 140 over the network 180. The network 180 may be embodied as any number of various wired and/or wireless communication networks. For example, the network 180 may be embodied as or otherwise include a local area network (LAN), a personal area network (PAN), a wide area network (WAN), a cellular network, or a publicly-accessible, global network such as the Internet. Additionally, the network 180 may include any number of additional devices to facilitate communication between the wearable computing device 110, the recipient computing device 140, and other devices of the system 100 as discussed below.

The recipient computing device 140 may be embodied as any type of computing device capable of performing the functions described herein including, but not limited to, a wrist-based computing device, a smart watch, an optical head-mounted display, a mobile computing device, a mobile phone, a smart phone, a tablet computing device, a personal digital assistant, a consumer electronic device, a laptop computing device, a desktop computer, and/or other type of computing device. As such, the recipient computing device 140 may include devices and structures commonly found in computing devices such as processors, memory devices, communication circuitry, and data storages, which are not shown in FIG. 1 for clarity of the description. In some embodiments, the recipient computing device 140 receives a text message (e.g., a short message service message, an email message, a web address, a username, a password, a social media post, a social media status update, a chat message, a group text message, etc.) generated by the wearable computing device 110. For example, the recipient computing device 140 may receive the text message directly from the wearable computing device 110. The recipient computing device 140 may receive the text message directly from the wearable computing device 110 via a wireless communication channel, a short-range wireless communication channel, a cellular communication channel, and/or any other type of communication channel capable of direct transmission of the text message from the wearable computing device 110 to the recipient computing device 140. Additionally or alternatively, the recipient computing device 140 may receive the text message from the wearable computing device 110 via another computing device (e.g., a proxy computing device). For example, the recipient computing device 140 may receive the text message from the mobile computing device 150 and/or the cloud server 160, which may be configured to be proxy devices for the wearable computing device 110. It should be appreciated that the recipient computing device 140 may also be configured to send (e.g., transmit) text messages, context data, icons, and/or any other type of data to the wearable computing device 110, the mobile computing device 150, and/or the cloud server 160.

In some embodiments, the system 100 may also include one or more mobile computing devices 150 and one or more cloud servers 160, which may communicate with the wearable computing device 110 over the network 180. The mobile computing device 150 may be embodied as any type of computing device capable of performing the functions described herein including, but not limited to, a wrist-based computing device, a smart watch, an optical head-mounted display, a mobile computing device, a mobile phone, a smart phone, a tablet computing device, a personal digital assistant, a consumer electronic device, a laptop computing device, a desktop computer, and/or other type of computing device. As such, the mobile computing device 150 may include devices and structures commonly found in computing devices such as processors, memory devices, communication circuitry, and data storages, which are not shown in FIG. 1 for clarity of the description. In some embodiments, the mobile computing device 150 is configured to communicate with the wearable computing device 110, the recipient computing device 140, the cloud server 160, and/or any other computing device of the system 100. In some embodiments, the mobile computing device 150 may also be configured to function as a proxy device to facilitate communications between the wearable computing device 110 and the recipient computing device 140 and/or the cloud server 160. Additionally or alternatively, the mobile computing device 150 may be used by the user to control and/or configure one or more features of the wearable computing device 110. For example, in some embodiments, the mobile computing device 150 receives a text message (e.g., a short message service message, an email message, a web address, a username, a password, a social media post, a social media status update, a chat message, a group text message, etc.) generated by the wearable computing device 110. The mobile computing device 150 may also be configured to receive context data 124 associated with the wearable computing device 110 and/or the user of the wearable computing device 110. Additionally or alternatively, the mobile computing device 150 may be configured to send (e.g., transmit) a text message, one or more user-selectable icons 122, context data 124, and/or any other type of data to the wearable computing device 110, the recipient computing device 140, and/or the cloud server 160. As discussed, in some embodiments, the mobile computing device 150 may be configured as a proxy device between the wearable computing device 110 and the recipient computing device 140, the cloud server 160, and/or any other computing device. In such embodiments, the mobile computing device 150 may communicate with the recipient computing device 140 and/or the cloud server 160 on behalf of the wearable computing device 110.

The cloud server 160 may be embodied as any type of computing device server capable of performing the functions described herein including, but not limited to, a server computer, a desktop computer, a laptop computer, and/or other type of computing device. As such, the cloud server 160 may include devices and structures commonly found in computing devices such as processors, memory devices, communication circuitry, and data storages, which are not shown in FIG. 1 for clarity of the description. In some embodiments, the cloud server 160 is configured to communicate with the wearable computing device 110, the recipient computing device 140, the mobile computing device 150, and/or any other computing device of the system 100. In some embodiments, the cloud server 160 may also be configured generate context data 124 indicative of the context of the wearable computing device 110 and/or the user of the wearable computing device 110. For example, the cloud server 160 may be configured to monitor the user's online communication activities (e.g., short message service messages, email messages, web browsing history, communication contacts, message recipients, message sources, social media posts, social media status updates, chat messages, group text messages, online gaming history, online streaming history, etc.) to generate corresponding context data 124. Additionally or alternatively, the cloud server 160 may be configured to monitor characteristics and/or operational status information of the wearable computing device 110 (e.g., location data, communication history, wireless signal strength, power level, etc.) to generate corresponding context data 124. In some embodiments, the cloud server 160 may send (e.g., transmit) the generated context data 124 to the wearable computing device 110, which may be used by the wearable computing device 110 to facilitate determining the current context associated with the wearable computing device 110. Additionally or alternatively, the mobile computing device 150 is configured to send (e.g., transmit) a text message, one or more user-selectable icons 122, and/or any other type of data to the wearable computing device 110, the recipient computing device 140, the mobile computing device 150, and/or any other type of computing device.

Figure 2:
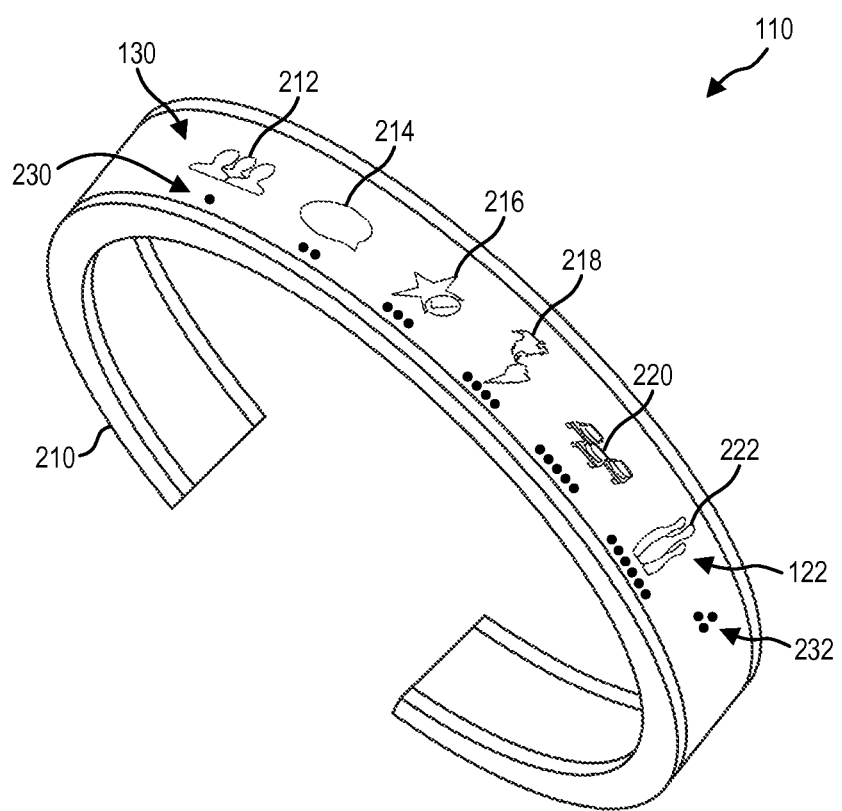
FIG. 2 is an illustrative embodiment of the wearable computing device of the system of FIG. 1.

As discussed, in some embodiments, the wearable computing device 110 may be embodied as a wrist-based computing device 210 such as the one illustratively shown in FIG. 2. In such embodiments, the wrist-based computing device 210 may display the one or more user-selectable icons 122 (e.g., the user-selectable icons 212-222) on the display device 130 based on the context associated with the wrist-based computing device 210. As discussed, each of the one or more user-selectable icons 122 (e.g., the user-selectable icons 212-222) may have a different textual meaning to the user based on the context of the wrist-based computing device 210 and/or the context of the user. For example, as illustratively shown, the wrist-based computing device 210 may display a user-selectable contact icon 212 indicative of one or more contacts the user typically communicates with, a text message user-selectable icon 214 to request generation of a new text message, a task user-selectable icon 216 indicative of a task to be performed by the user and/or a recipient, a location user-selectable icon 218 indicative of the current location of the user and/or the recipient, a destination user-selectable icon 220 indicative of a final destination of the user and/or the recipient, and an activity user-selectable icon 222 indicative of an activity of the user and/or the recipient. Of course, it should be appreciated that the wrist-based computing device 210 (or other wearable computing device 110) may display or otherwise include different user-selectable icons and/or similar user-selectable icons having different textual meanings in other embodiments. As discussed in more detail below, wrist-based computing device 210 may generate a text message in response to receiving the user's selection of one or more of the user-selectable icons 212-222 via the display device 130, which may be embodied as a touch sensitive display device.

In some embodiments, the wearable computing device 110 (e.g., the wrist-based computing device 210) may include a tactile map 230, 232 (e.g., unique patterns of raised dots, notches, etc.) to facilitate the user selecting one or more of the user-selectable icons 212-222 by providing a tactile feedback to the user to identify the individual icons, rows, columns, or other location identification associated with the user-selectable icons 130. Additionally, the wearable computing device 110 (e.g., the wrist-based computing device 210) may generate a visual (e.g., indicator lights, messages, icons, etc.), audible (e.g., beeps, tones, rings, etc.), and/or somatosensory response (e.g., tactile feedback) to alert or otherwise notify the user of the selection and/or identity of one or more of the user-selectable icons 122. In that way, a user familiar with the wearable computing device 110 (e.g., the wrist-based computing device 210) may interact with the wearable computing device 110 without needing to look at which icons 122 are currently being displayed. In doing so, the user may discretely generate text messages.

Figure 3:
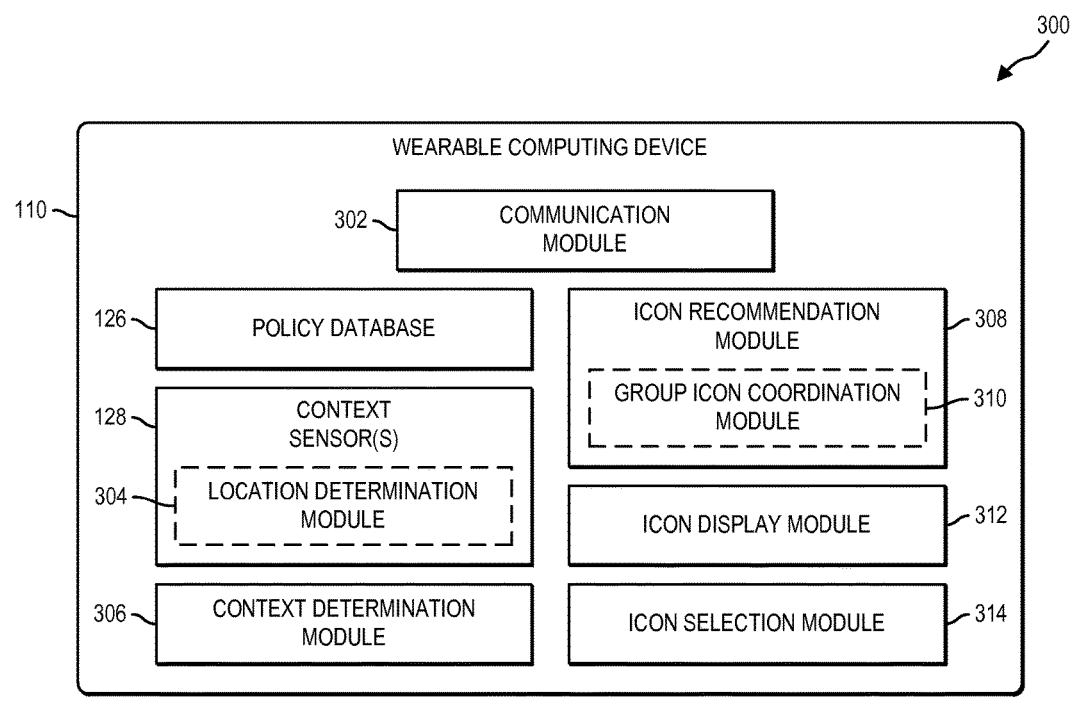
FIG. 3 is a simplified block diagram of at least one embodiment of an environment of the wearable computing device of FIG. 1.

Referring now to FIG. 3, in use, the wearable computing device 110 establishes an environment 300 during operation. The illustrative environment 300 includes a communication module 302, a context determination module 306, an icon recommendation module 308, an icon display module 312, an icon selection module 314, the policy database 126, and the context sensor(s) 128. As discussed in more detail below, the context sensor(s) 128 may include a location determination module 304. In some embodiments, the icon recommendation module 308 may also include a group icon coordination module 310 as discussed below. Each of the modules 302, 304, 306, 308, 310, 312, 314, 126, and 128 of the environment 300 may be embodied as hardware, software, firmware, or a combination thereof. It should be appreciated that the wearable computing device 110 may include other components, sub-components, modules, and devices commonly found in a computing and/or warning device, which are not illustrated in FIG. 3 for clarity of the description.

The communication module 302 of the wearable computing device 110 facilitates communications between components or sub-components of the wearable computing device 110 and the wearable computing device 110, the recipient computing device 140, the mobile computing device 150, and/or the cloud server 160. For example, in some embodiments, the wearable computing device 110 may send (e.g., transmit) a text message to the recipient computing device 140, the mobile computing device 150, and/or the cloud server 160 based at least in part on the user selecting one or more of the user-selectable icons 122. In some embodiments, the communication module 302 may also be configured to receive one or more user-selectable icons 122, textual meanings, and/or context data 124 from the recipient computing device 140, the mobile computing device 150, and/or the cloud server 160 for storage in the data storage 120.

As discussed, the policy database 126 may include one or more rules for determining a selection of the user-selectable icons 122 to display to the user based on the context associated with the wearable computing device 110. Additionally or alternatively, the policy database 126 may include probability data associated with each of the user-selectable icons 122. In such embodiments, the probability data for a particular user-selectable icon 122 may be indicative of the probability that the user-selectable icon 122 will be selected by the user based on one or more reference contexts. The policy database 126 may also include one or more textual meanings associated with each of the user-selectable icons 122 based on the context of the wearable computing device 110 and/or the context of the user of the wearable computing device 110.

As discussed, the one or more context sensors 128 may be embodied as any type of device or devices configured to capture context data 124 indicative of a context of the wearable computing device 110 and/or the user of the wearable computing device 110. In some embodiments, the context sensor(s) 128 sense characteristics of the user and/or information corresponding to the operating environment of the wearable computing device 110. Additionally or alternatively, the context sensor(s) 128 may also be configured to sense context data 124 associated with the user's interactions with other people. For example, in some embodiments, the context sensor(s) 128 may monitor communication messages accessible by the wearable computing device 110 and generate context data 124 indicative of the recipient of a particular communication message, the time of day a communication was generated or received, the content of a communication message, the textual meaning associated with a particular user-selectable icon 122 that was selected to generate a communication message, and/or any other type of information from which context data 124 may be generated.

Additionally, in some embodiments, the context sensor(s) 128 may include a location determination module 304. In such embodiments, the location determination module 304 is configured to determine a current location (e.g., work, home, school, recreational places, city, state, country, city, state, region, latitude, longitude, altitude, etc.) of the wearable computing device 110. For example, in some embodiments, one of the context sensors 128 may be embodied as a global positioning system (GPS) device and/or any other device configured to generate data indicative of the location of the wearable computing device 110. In such embodiments, the location determination module 304 may determine the current location of the wearable computing device 110 based on the generated location data.

The context determination module 306 is configured to determine the context of the wearable computing device 110 and/or the user of the wearable computing device 110. To do so, the context determination module 306 may analyze the context data 124 captured by the context sensor(s) 128. Such context data 124 may be indicative of the context of the wearable computing device 110 itself and/or the context of the user of the wearable computing device 110. For example, the context determination module 306 may analyze the context data 124 to determine a current location of the wearable computing device 110 (e.g., work, home, school, recreational places, city, state, country, etc.), an activity of the user of the wearable computing device 110 (e.g., reading, working, studying, swimming, hiking, grocery shopping, etc.), and/or who the user of the wearable computing device 110 is currently communicating with (e.g., a family member, a friend, a colleague, etc.). It should be appreciated that any other context of the wearable computing device 110 and/or the user of the wearable computing device 110 may be determined by the wearable computing device 110. Additionally or alternatively, the context determination module 306 may analyze context data received from another computing device to determine the context of the wearable computing device 110 and/or the user of the wearable computing device 110. For example, the context determination module 306 may analyze context data captured by and received from the recipient computing device 140, the mobile computing device 150, the cloud server 160, and/or any other remote computing device.

The icon recommendation module 308 is configured to determine one or more recommended user-selectable icons 122 to be displayed on the display device 130 based on the context associated with the wearable computing device 110. Each of the one or more user-selectable icons 122 may be associated with any number of different textual meanings based on the current context associated with the wearable computing device 110. In some embodiments, the icon recommendation module 308 determines the one or more user-selectable icons 122 to be displayed based at least in part on, or otherwise as a function of, the probability that the one or more user-selectable icons 122 will be selected by the user given the current context associated with the wearable computing device 110. For example, based on the current context associated with the wearable computing device 110, the icon recommendation module 308 may determine that a particular subset and/or group of the user-selectable icons 122 should be displayed. However, if the context associated with the wearable computing device 110 changes, the icon recommendation module 308 may determine that a different subset and/or group of the user-selectable icons 122 should be displayed instead. Additionally or alternatively, in some embodiments, the icon recommendation module 308 is configured to compare the current context of the wearable computing device 110 to the policy database 126 to facilitate determining which user-selectable icons 122 should be displayed. As discussed in more detail below, the policy database 126 includes one or more rules for determining which user-selectable icons 122 to display to the user based on the context associated with the wearable computing device 110 (e.g., the context of the wearable computing device 110 and/or the context of the user of the wearable computing device 110).

Additionally or alternatively, the icon recommendation module 308 may generate recommendations of the textual meanings of one or more of the user-selectable icons 122. To do so, the icon recommendation module 308 analyzes the communication messages accessible to the wearable computing device 110 and monitored by the context sensor(s) 128. For example, in some embodiments, the icon recommendation module 308 is configured to analyze the generated context data indicative of the recipient of one or more communication messages, the time of day one more communication messages were generated or received, the content of one or more communication messages, the textual meanings associated with one or more user-selectable icons 122 selected to generate a communication message, and/or any other type of information from which context data was generated. Based on that analysis, the icon recommendation module 308 may determine a probable textual meaning for a particular user-selectable icon 122. The icon recommendation module 308 may then provide the user with a recommendation that the probable textual meaning be associated with the particular user-selectable icon 122. In that way, the icon recommendation module 308 may learn the user's communication style.

In some embodiments, the icon recommendation module 308 includes the group icon coordination module 310. As discussed, each of the one or more user-selectable icons 122 may be associated with any number of different textual meanings based on the current context associated with the wearable computing device 110. In some embodiments, different groups of users may associate different textual meanings with a particular user-selectable icon 122 based on the context associated with the wearable computing device 110. For example, a group of users may use a user-selectable icon 122 depicting a book to generate a text message indicating that they are doing homework in response to the wearable computing device 110 being located at school. In contrast, the group of users may use the same user-selectable icon 122 depicting the book to generate a text message indicating that they are reading a novel in response to the wearable computing device 110 being located at home. In such embodiments, the different textual meanings used for a particular user-selectable icon 122 may be coordinated by the group icon coordination module 310 based on the context associated with the wearable computing device 110.

The icon display module 312 is configured to display the user-selectable icon(s) 122 determined by the icon recommendation module 308 based on the context associated with the wearable computing device 110. In some embodiments, the icon display module 312 is additionally configured to determine the layout of how the determined user-selectable icons 122 should be displayed on the display device 130 of the wearable computing device 110. For example, in some embodiments, the icon display module 312 may be configured to display the user-selectable icons 122 as a single row of user-selectable icons 122 or as multiple rows of user-selectable icons 122. Additionally or alternatively, the icon display module 312 may be configured to display a plurality of the user-selectable icons 122 in different quadrants grouped according to the textual meaning associated with each user-selectable icon 122 (see, e.g., FIGS. 9A-9E). The icon display module 312 may also be configured to increase and/or decrease the display size of the one or more user-selectable icons 122 based on one or more selections made by the user of the wearable computing device 110. In that way, the icon display module 312 may be configured to "zoom in" and "zoom out" of user-selectable icons 122 and/or quadrants displayed on the display device 130.

The icon selection module 314 is configured to determine whether one or more of the user-selectable icons 122 displayed on the display device 130 is selected by the user of the wearable computing device 110. To do so, the icon selection module 314 may be configured to determine whether a signal indicative of the user's selection of one of the user-selectable icons 122 is received from the touch sensitive display device 130. In embodiments wherein the one or more user-selectable icons 122 are grouped and displayed in quadrants according to the textual meanings associated therewith, the icon selection module 314 may also be configured to determine whether one or more of the quadrants are selected.

In some embodiments, the icon selection module 314 may also be configured to determine whether one or more user-selectable sub-icons (e.g., related user-selectable icons) should be displayed in response to the selection of a user-selectable icon 122. For example, in some embodiments, the icon selection module 314 may determine that the icon display module 312 should display one or more user-selectable sub-icons relating a time or duration (e.g., 5 minutes, 10 minutes, 15 minutes, 1 hour, 1 day, 1 week, etc.) in response to a user's selection of a user-selectable icon 122 having an associated textual meaning corresponding to the user's home. In that way, the user may generate a text message indicating that they will be home in 15 minutes. It should be appreciated that the icon selection module 314 may determine that any number of user-selectable sub-icons having any number of different textual meaning associated therewith should be displayed in response to the user's selection of a particular user-selectable icon 122.

Additionally, the icon selection module 314 is configured to generate a text message (e.g., a short message service message, an email message, a web address, a username, a password, a social media post, a social media status update, a chat message, a group text message, etc.) based at least in part on, or otherwise as a function of, the user selecting one or more of the user-selectable icons 122. For example, the icon selection module 314 is configured to determine whether a user-selectable icon 122 is selected by a user of the wearable computing device 110 via the touch sensitive display device 130. In response to determining that the user-selectable icon 122 is selected by the user, the icon selection module 314 may retrieve the textual meaning associated with the selected user-selectable icon 122 from the policy database 126 based on the context associated with the wearable computing device 110. As discussed, the textual meaning associated with the selected user-selectable icon 122 may be embodied as one or more characters (e.g., a single character, a string of characters, a phrase, a word, etc.) that may be retrieved from the policy database 126.

After retrieving the textual meaning associated with the selected user-selectable icon 122 from the policy database 126, the icon selection module 314 may generate the text message. It should be appreciated that in some embodiments the icon selection module 314 may determine that more than one user-selectable icon 122 is selected by the user of the wearable computing device 110 via the touch sensitive display device 130. In such embodiments, the icon selection module 314 may retrieve the textual meaning associated with each of the selected user-selectable icons 122 from the policy database 126. The icon selection module 314 may then combine (e.g., aggregate, concatenate, etc.) each of the received textual meanings to generate the text message.

The icon selection module 314 is also configured to associate a received textual meaning with a user-selectable icon 122. To do so, the icon selection module 314 may receive textual input data from the wearable computing device 110, the mobile computing device 150, the cloud server 160, and/or any other type of computing device. The received textual input data may be indicative of a textual meaning to be associated with a selected user-selectable icon 122. In response to receiving the textual input data, the icon selection module 314 associates the received textual input with the selected user-selectable icon 122. In some embodiments, the icon selection module 314 stores the textual input in association with the selected user-selectable icon 122 in the policy database 126.

Figure 4:
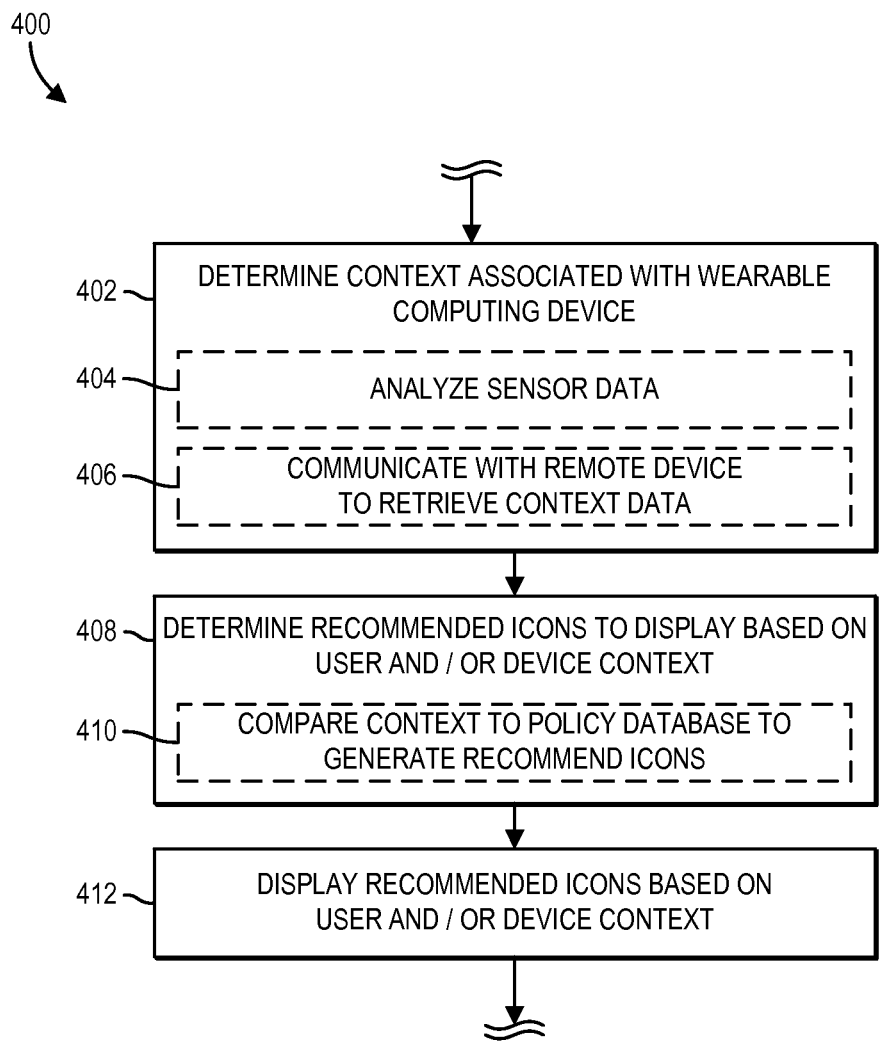
FIG. 4 is a simplified flow diagram of at least one embodiment of a method that may be executed by the wearable computing device of FIG. 1 for determining user-selectable icons to display based on a context of the wearable computing device.

Referring now to FIG. 4, the wearable computing device 110 may execute a method 400 for determining one or more of the user-selectable icons 122 to display based on the context associated with the wearable computing device 110. The method 400 begins with block 402 in which a context associated with the wearable computing device 110 is determined. To do so, the context of the wearable computing device 110 and/or the user of the wearable computing device 110 is determined in block 402. For example, the wearable computing device 110 may determine that the wearable computing device 110 is currently located at a particular place (e.g., work, home, school, recreational places, city, state, country, etc.). In another example, the wearable computing device 110 may determine that a user of the wearable computing device 110 is taking part in a particular activity based on an entry in the user's calendar and the current date and time. It should be appreciated that any context of the wearable computing device 110 and/or the context of the user that useable to determine the user-selectable icons 122 for display may be determined by the wearable computing device 110 in block 402.

In some embodiments, in block 404, the wearable computing device 110 analyzes the context data 124 captured by the context sensor(s) 128 to facilitate determining the context associated with the wearable computing device 110. As discussed, the context data 124 captured by the context sensor(s) 128 is indicative of the context of the wearable computing device 110 itself and/or the context of the user of the wearable computing device 110. For example, in some embodiments, the wearable computing device 110 analyzes location data captured by the context sensor(s) 128 to determine a current location (e.g., work, home, school, recreational places, city, state, country, city, state, region, latitude, longitude, altitude, etc.) of the wearable computing device 110. In another example, the wearable computing device 110 may analyze context data 124 associated with communication messages monitored by the context sensor(s) 128. For example, the wearable computing device 110 may analyze context data 124 indicative of the recipient of a particular communication message, the time of day a communication was generated or received, the content of a communication message, the textual meaning associated with a particular user-selectable icon 122 that was selected to generate a communication message, and/or any other type of information from which context data may be generated. In yet another example, the wearable computing device 110 may analyze context data 124 associated with the user's schedule. For instance, the wearable computing device 110 may analyze context data 124 generated from the user's calendar to facilitate determine what the user is currently doing given the current data and time. It should be appreciated that any other type of context data 124 captured by the context sensor(s) 128 may be analyzed by the wearable computing device 110.

Additionally or alternatively, in some embodiments, the wearable computing device 110 receives context data from a remote computing device, in block 406. For example, the wearable computing device 110 may communicate with the cloud server 160 to receive the context data therefrom, which may be indicative of the context of the wearable computing device 110 and/or the context of the user of the wearable computing device 110. The wearable computing device 110 may also receive context data from other remote devices including, but not limited to, the mobile computing device 150 and the recipient computing device 140. In such embodiments, the wearable computing device 110 may use the received context data to facilitate determining the context associated with the wearable computing device 110.

In block 408, the wearable computing device 110 determines one or more recommended user-selectable icons 122 to be displayed based on the context of the wearable computing device 110 and/or the context of the user of the wearable computing device 110. As discussed, each of the one or more user-selectable icons 122 may be associated with any number of different textual meanings based on the current context associated with the wearable computing device 110. In the illustrative embodiment, the wearable computing device 110 determines one or more of the user-selectable icons 122 to be displayed based at least in part on, or otherwise as a function of, the probability (e.g., historical probability) that the one or more user-selectable icons 122 will be selected by the user given the current context associated with the wearable computing device 110. For example, in some embodiments, the wearable computing device 110 may determine that the user of the wearable computing device 110 typically communicates with one group of recipients during the week (e.g., colleagues, business contacts, clients, etc.) and a different group of recipients on the weekend (e.g., family, friends, etc.). In such embodiments, the user may use a particular subset or group of the user-selectable icons 122 when communicating with the one group of recipients during the week and a different subset or group of the user-selectable icons 122 when communicating with the other group during the weekend. As such, the wearable computing device 110 may select an appropriate subset and/or group of the user-selectable icons 122 based on the current day of the week. It should be appreciated that the wearable computing device 110 may determine the one or more user-selectable icons 122 to display based on any other determined context associated with the wearable computing device 110.

In some embodiments, in block 410, the wearable computing device 110 compares the current context of the wearable computing device 110 to the policy database 126. The policy database 126 includes one or more rules for determining one or more of the user-selectable icons 122 to display to the user based on the context associated with the wearable computing device 110. In some embodiments, the policy database 126 may include probability data computed for each of the user-selectable icons 122 and/or each of a plurality of reference contexts. In such embodiments, the wearable computing device 110 may compare the current context to the plurality of reference contexts of the policy database 126. As a function of that comparison, the wearable computing device 110 may determine whether the current context is the same or substantially similar to any of the reference contexts of the policy database 126. If so, the wearable computing device 110 may then determine which user-selectable icons 122 are most likely (e.g., most probable) to be selected by the user based on the probability data computed for each of the user-selectable icons 122 for the determined reference context.

One illustrative embodiment of the policy database 126 is shown in FIG. 5. The illustrative policy database 125 includes a plurality of user-selectable icons 122 and a plurality of textual meanings 510, each associated with a corresponding user-selectable icon 122. In some embodiments, a particular user-selectable icon 122 (e.g., 'ICON_2' 502) may have more than one textual meaning associated therewith (e.g., 'MEANING_A' 512 and 'MEANING_B' 514). In such embodiments, the policy database 126 may be used to select the appropriate textual meaning based at least in part on, or otherwise as a function of, the current context of the wearable computing device 110.

Additionally, the policy database 126 may include one or more reference contexts 520. In some embodiments, each of the one or more reference contexts 520 may be indicative of a different historical context associated with the wearable computing device 110 (e.g., the historical context of the wearable computing device 110 and/or the historical context of the user of the wearable computing device 110). Additionally or alternatively, one or more of the reference contexts 520 may be indicative of one or more user-defined (e.g., user-generated) contexts associated with the wearable computing device 110. In that way, the user of the wearable computing device 110 may customize and/or manually define which user-selectable icons 122 should be displayed based on a current context of the wearable computing device 110.

The policy database 126 may also include probability data 530 computed for each of the user-selectable icons 122 and each of the reference contexts 520. As discussed, the probability data 530 for a particular user-selectable icon 122 may be indicative of the probability that the user-selectable icon 122 will be selected by the user based on the one or more reference contexts 520.

Referring back to FIG. 4, it should be appreciated that although the wearable computing device 110 compares the current context to the policy database 126 to determine the one or more user-selectable icons 122 to display in the illustrative embodiment of block 408, the wearable computing device 110 may use any other process for determining the one or more user-selectable icons 122 to display in other embodiments. Regardless, after determination of the user-selectable icon(s) 122 to be displayed, the wearable computing device 110 displays the selected user-selectable icon(s) 122 in block 412.

Figure 6A:
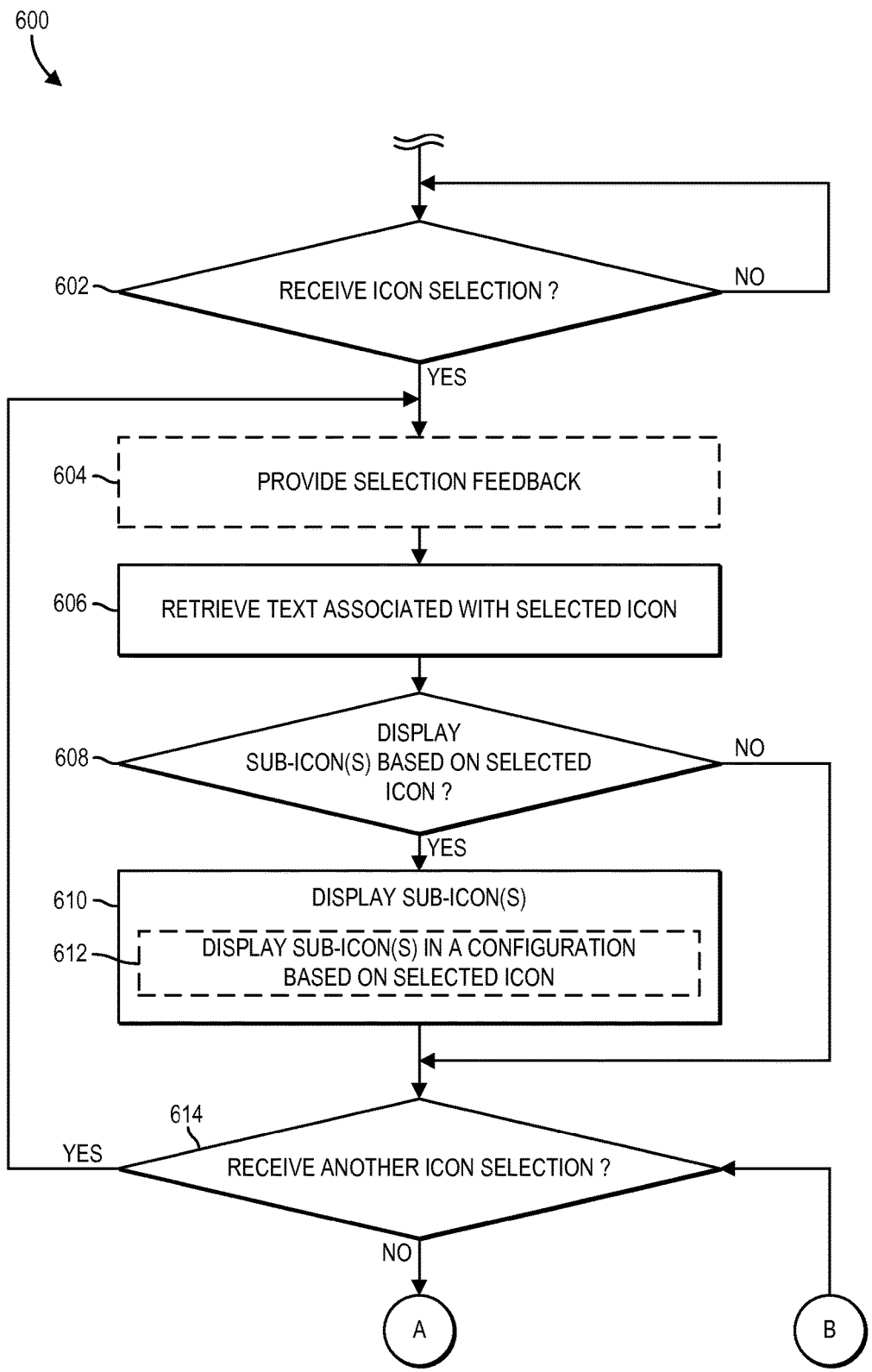
FIGS. 6A-6B is a simplified flow diagram of at least one embodiment of a method that may be executed by the wearable computing device of FIGS. 1 and 3 for generating a text message from user-selectable icons displayed on the wearable computing device.
Figure 6B:
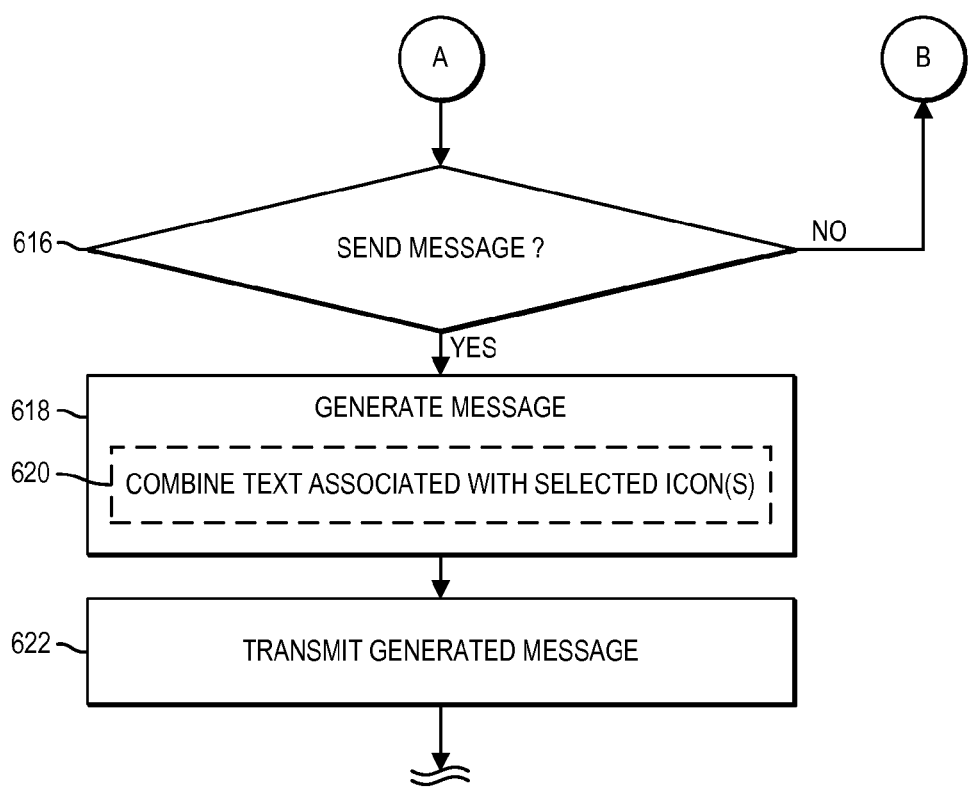
Figure 7A:
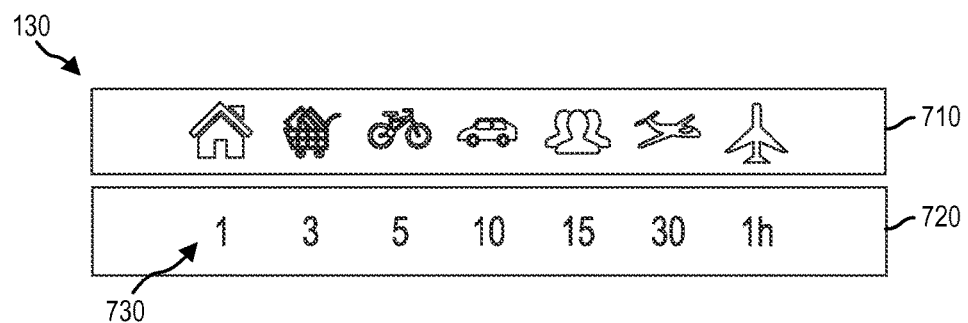
FIGS. 7A-7C is an illustrative embodiment of a graphical interface of the wearable computing device of FIGS. 1 and 3 during execution of the method of FIGS. 6A-6B.
Figure 7B:
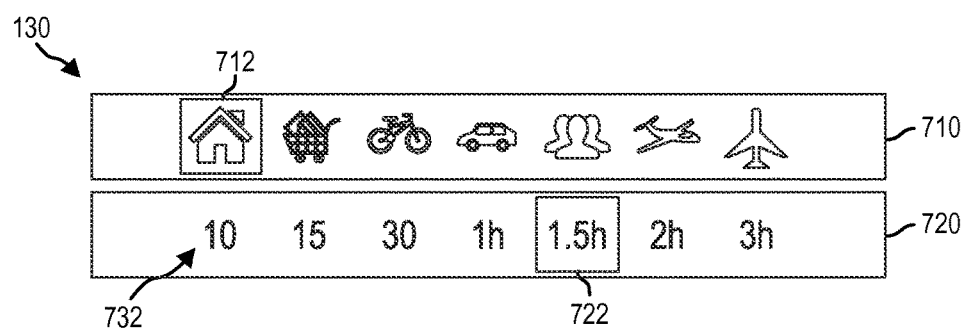
Figure 7C:
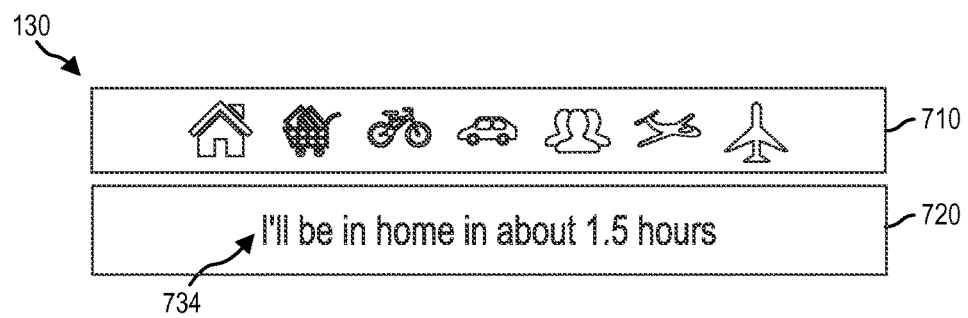

Referring now to FIGS. 6A-6B, in use, the wearable computing device 110 may execute a method 600 for generating a text message from user-selectable icons 122 displayed on the wearable computing device 110. In some embodiments, the user-selectable icons 122 may be displayed in multiple rows, columns, or quadrants of the display device 130 (e.g., the top row 710 and the bottom row 720 of FIGS. 7A-7C). The method 600 begins with block 602 in which the wearable computing device 110 determines whether a selection of a user-selectable icon 122 is made by the user. To do so, the wearable computing device 110 determines whether a signal generated in response to the user's selection of the user-selectable icon 122 (e.g., the selection 712 of FIG. 7B) via the touch sensitive display device 130 has been received. If, in block 602, the wearable computing device 110 determines that a selection of the user-selectable icon 122 has not been received, the method 600 loops back to block 602 to continue determining whether a selection of the user-selectable icon 122 is received.

In some embodiments, in block 606, in response to determining that a selection of a user-selectable icon 122 has been received, the wearable computing device 110 may provide the user with feedback of the selection. For example, in response to the user selecting one of the user-selectable icons 122, the wearable computing device 110 may generate a visual (e.g., indicator lights, on-screen messages, icons, etc.), audible (e.g., beeps, tones, rings, etc.), and/or somatosensory response (e.g., tactile feedback) to alert or otherwise notify the user of the selection. In some embodiments, the feedback provided to the user may be generated by the feedback device 132 of the wearable computing device 110.

In block 606, the wearable computing device 110 retrieves a textual meaning associated with the selected user-selectable icon 122 (e.g., text defining or indicative of the meaning of the selected user-selectable icon 122 given the current context) from the policy database 126 based on the current context associated with the wearable computing device 110. After retrieving the textual meaning associated with the selected user-selectable icon 122 from the policy database 126, the method 600 advances to block 608.

In block 608, the wearable computing device 110 determines whether one or more user-selectable sub-icons should be displayed in response to the selection of a user-selectable icon 122. In some embodiments, the one or more user-selectable sub-icons may be embodied as one or more user-selectable icons 122 related to the selected user-selectable icon 122. Additionally or alternatively, the one or more user-selectable sub-icons may be embodied as one or more of the user-selectable icons 122 that are likely (e.g., probable) to be selected by the user after selection of the selected user-selectable icon 122. For example, in some embodiments, in response to the user selecting a user-selectable icon 122 associated with a particular location and/or destination, the wearable computing device 110 may determine that one or more user-selectable sub-icons relating to different times and/or durations should be subsequently displayed. If, in block 608, the wearable computing device 110 determines that one or more user-selectable sub-icons should be displayed, the method 600 advances to block 610. If, however, the wearable computing device 110 determines that one or more user-selectable sub-icons should not be displayed, the method 600 advances instead to block 614.

In block 610, the wearable computing device 110 displays the one or more user-selectable sub-icons. In some embodiments, in block 612 the wearable computing device 110 displays the one or more user-selectable sub-icons in a configuration or format based on the selected user-selectable icon 122. For example, in embodiments wherein the display device 130 is configured to display multiple rows of the user-selectable icons 122, the wearable computing device 110 may display the selected user-selectable icon 122 on one row (e.g., the top row 710 of FIG. 7A) and the user-selectable sub-icon(s) on another row (e.g., the bottom row 720 of FIG. 7A). It should be appreciated that the wearable computing device 110 may display the one or more user-selectable sub-icons according to any display configuration and/or format (e.g., overlapping icons, tiled icons, cascaded icons, transparent icons, etc.) Additionally or alternately, in some embodiments, the wearable computing device 110 may display one or more default (e.g., initial, base, starting, etc.) user-selectable sub-icons (e.g., the default sub-icons 730 of FIG. 7A) prior to selection of the user-selectable icon 122 (e.g., the selected icon 712 of FIG. 7B). In such embodiments, the wearable computing device 110 may update or otherwise change the default user-selectable sub-icons (e.g., the updated sub-icons 732 of FIG. 7B) in response to selection of the user-selectable icon 122 as discussed above. In that way, the wearable computing device 110 may display user-selectable sub-icons that are contextually-relevant to the user's selection of one or more of the user-selectable icons 122.

In block 614, the wearable computing device 110 determines whether a selection of another user-selectable icon 122 (e.g., different than the previously selected user-selectable icon 122) is made by the user. To do so, the wearable computing device 110 determines whether a signal generated in response to the user's selection of another user-selectable icon 122 (e.g., the selection 722 of FIG. 7B) via the touch sensitive display device 130 has been received. If, in block 614, the wearable computing device 110 determines that a selection of another user-selectable icon 122 has been received, the method 600 loops back either to block 604 in which the wearable computing device 110 provides feedback to the user of the selection in some embodiments, or block 606 in which the wearable computing device 110 retrieves the textual meaning associated with the another selected user-selectable icon 122 from the policy database 126. If, however, the wearable computing device 110 determines that a selection of another user-selectable icon 122 has not been received, the method 600 advances to block 616 (see FIG. 6B).

In block 616, the wearable computing device 110 determines whether a text message should be sent (e.g., transmitted). In some embodiments, the wearable computing device 110 may determine whether the user of the wearable computing device 110 has indicated that a text message should be sent (e.g., transmitted) to the recipient computing device 140. To do so, the wearable computing device 110 determines whether a signal indicative of the user's selection of a message transmission command or function is received from the touch sensitive display device 130. If, in block 616, the wearable computing device 110 determines that a text message should be sent (e.g., transmitted), the method 600 advances to block 618. If, however, the wearable computing device 110 determines instead that a text message should not be sent (e.g., transmitted), the method 600 loops back to block 614 to continue determine whether another user-selectable icon 122 is selected.

In block 618, the wearable computing device 110 generates a text message (e.g., a short message service message, an email message, a web address, a username, a password, a social media post, a social media status update, a chat message, a group text message, etc.) from a selected user-selectable icon 122. To do so, the wearable computing device 110 incorporates or otherwise embeds the retrieved textual meaning associated with the selected user-selectable icon 122 into the text message. In block 620, in embodiments wherein more than one user-selectable icon 122 is selected, the wearable computing device 110 may combine (e.g., concatenate, aggregate, etc.) the textual meaning associated with each of the selected user-selectable icons 122. The wearable computing device 110 then incorporates or otherwise embeds the combined textual meaning into the text message. In embodiments wherein the display device 130 displays the one or more user-selectable icons 122 on multiple rows (e.g., the rows 710, 720 of FIGS. 7A-7C), the wearable computing device 110 may also be configured to display the combined textual meaning (e.g., the combined textual meaning 734 of FIG. 7C).

In block 622, the wearable computing device 110 transmits (e.g., sends) the generated text message to the recipient computing device 140. Additionally or alternatively, in some embodiments, the wearable computing device 110 transmits the generated text message to the mobile computing device 150, the cloud server 160, and/or any other remote computing device.

Figure 8A:
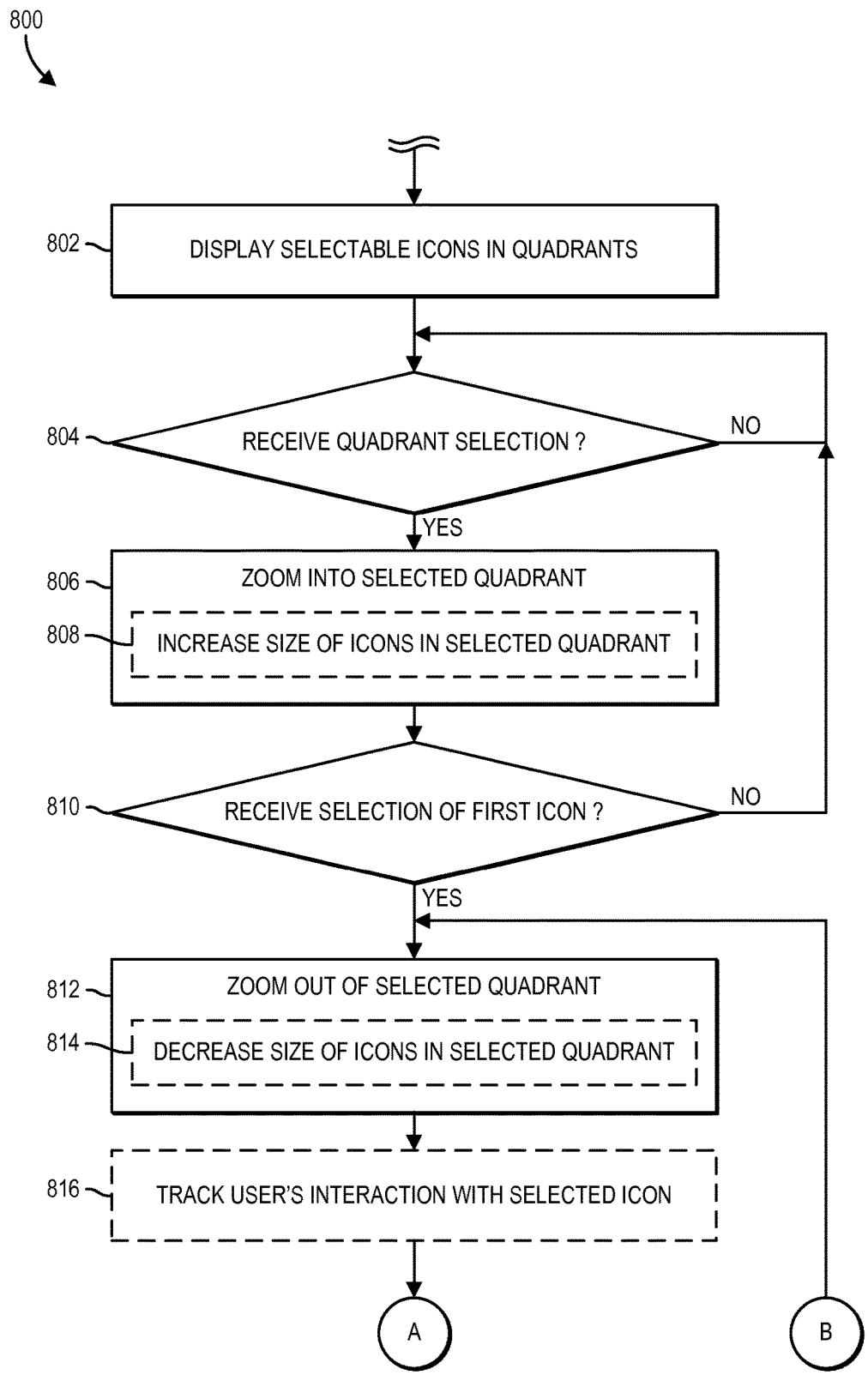
FIGS. 8A-8B is a simplified flow diagram of at least one embodiment of a method that may be executed by the wearable computing device of FIGS. 1 and 3 for generating a text message from user-selectable icons displayed on the wearable computing device in different quadrants.
Figure 8B:
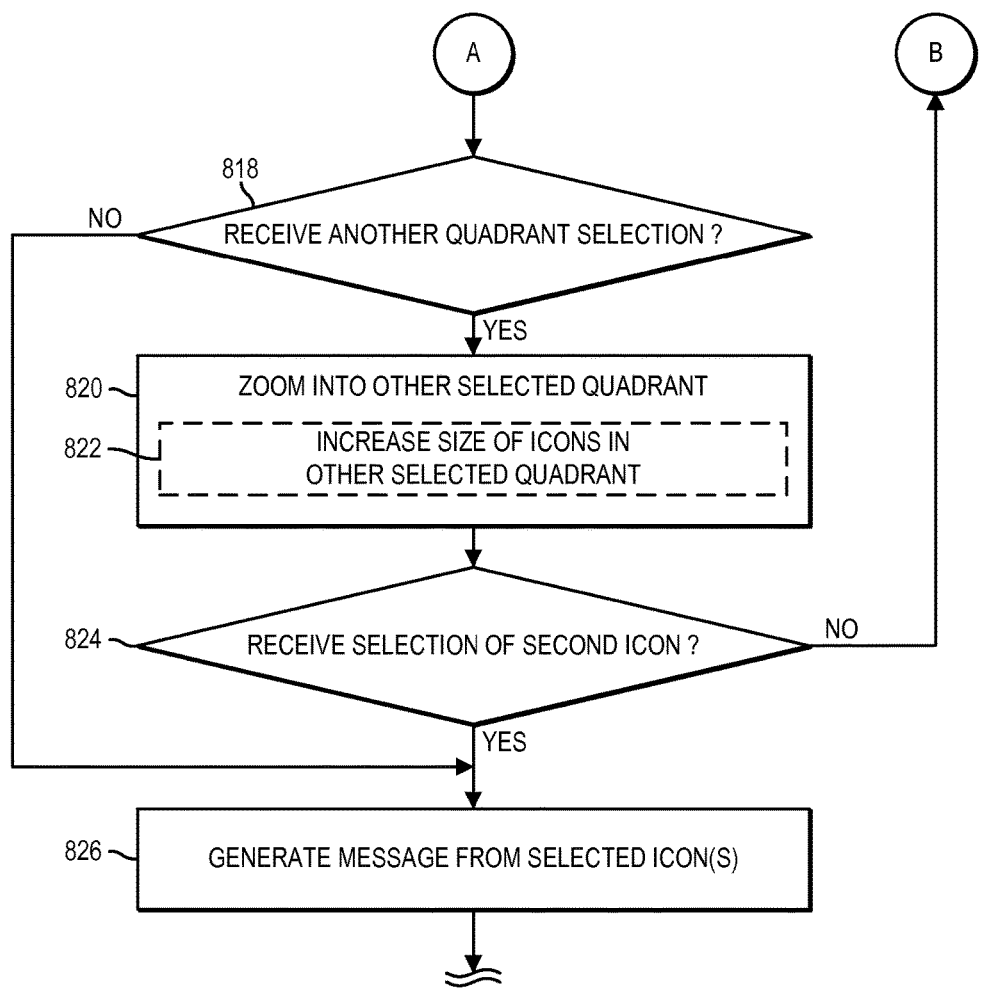

Referring now to FIGS. 8A-8B, in some embodiments, the wearable computing device 110 may execute a method 800 for generating a text message from user-selectable icons 122 displayed in different quadrants. The method 800 begins with block 802 in which the wearable computing device 110 displays a plurality of user-selectable icons 122 in different quadrants. For example, as illustratively shown in FIG. 9A, a plurality of user-selectable icons 912, 922, 932, 942 are displayed in different quadrants 910, 920, 930, 940. In some embodiments, the wearable computing device 110 displays or otherwise groups user-selectable icons 122 based at least in part on, or otherwise as a function of, the textual meanings associated with each. For example, the wearable computing device 110 may display all user-selectable icons 122 having an associated textual meaning relating to a destination and/or a location (e.g., the user-selectable icons 912) in the same quadrant (e.g., the quadrant 910). As another example, the wearable computing device 110 may display all user-selectable icons 122 having an associated textual meaning relating to a time or duration (e.g., the user-selectable icons 922) in the same quadrant (e.g., the quadrant 920). Additionally, all user-selectable icons 122 having an associated textual meaning that relates to an activity (e.g., the user-selectable icons 932) may be displayed in the same quadrant (e.g., the quadrant 930), and all user-selectable icons 122 having an associated textual meaning that relates to an emotion (e.g., the user-selectable icons 942) may be displayed in the same quadrant (e.g., the quadrant 940).

Referring back to FIGS. 8A-8B, in block 804, the wearable computing device 110 determines whether a selection of one of the quadrants (e.g., the quadrant 910 of FIG. 9B) is received. To do so, the wearable computing device 110 determines whether a signal indicative of the user's selection of the quadrant (e.g., the quadrant 910 of FIG. 9B) is received from the touch sensitive display device 130. If, in block 804, the wearable computing device 110 determines that the quadrant (e.g., the quadrant 910 of FIG. 9B) is selected, the method 800 advances to block 806. If, however, the wearable computing device 110 determines instead that the quadrant (e.g., the quadrant 910 of FIG. 9B) is not selected, the method 800 loops back to block 804 to continue determining whether the one of the quadrants (e.g., the quadrants 910, 920, 930, 940) is selected.

Figure 9A:
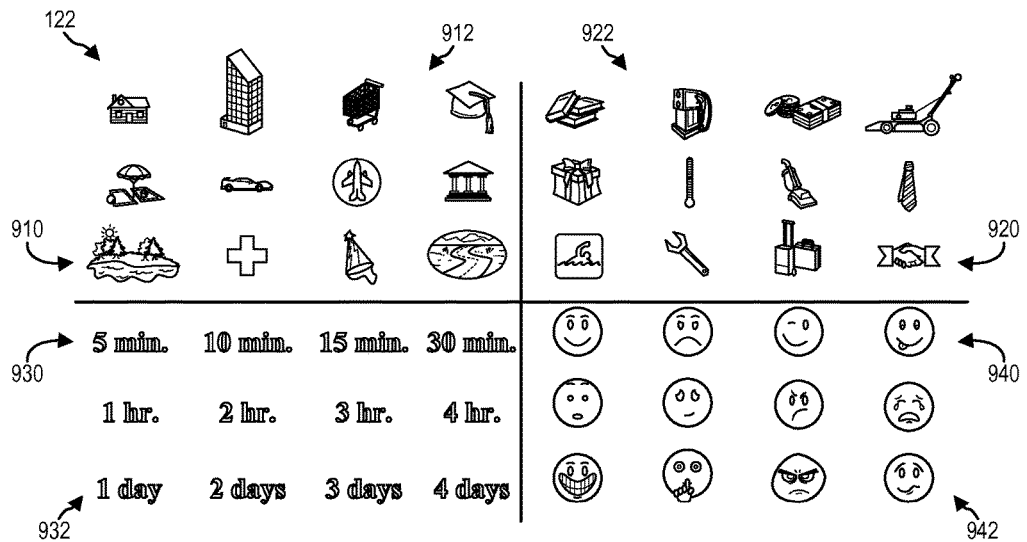
FIGS. 9A-9E is an illustrative embodiment of a graphical interface of the wearable computing device of FIGS. 1 and 3 during execution of the method of FIGS. 8A-8B.
Figure 9B:
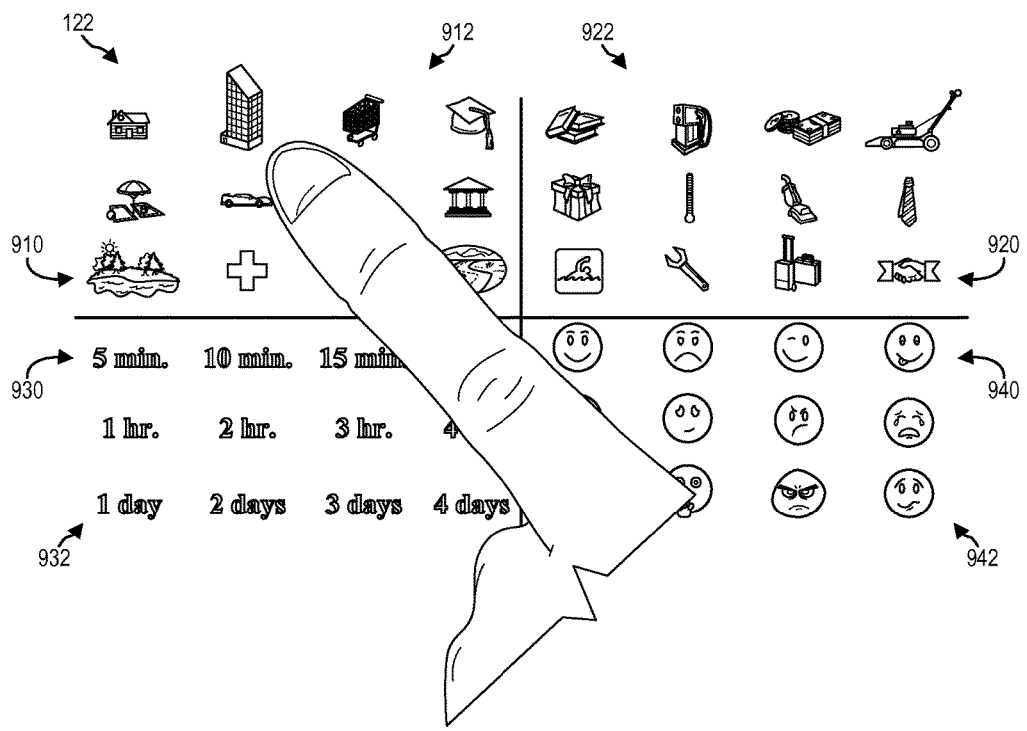
Figure 9C:
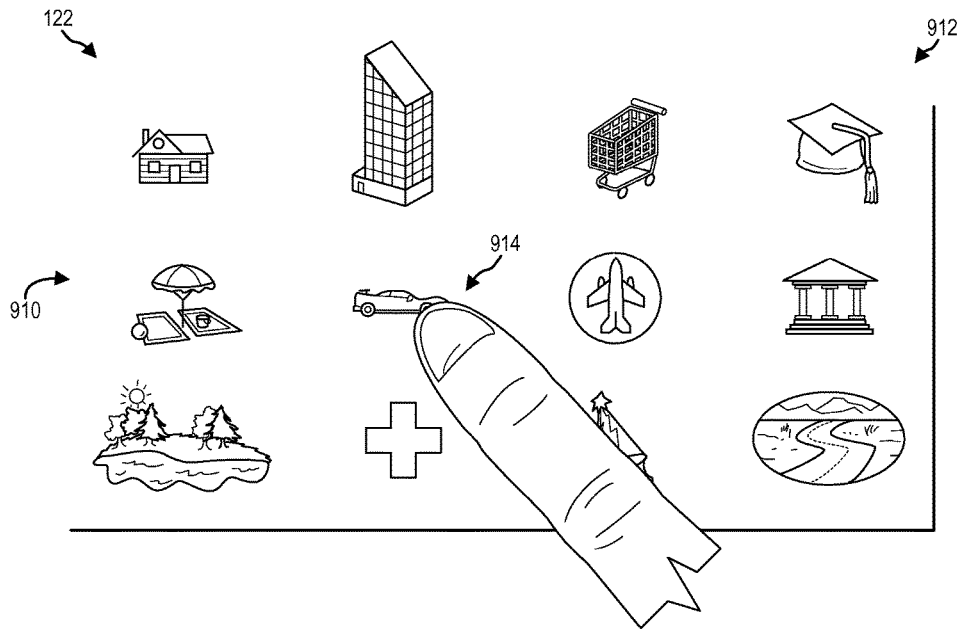

In block 806, the wearable computing device 110 zooms into the selected quadrant (e.g., the quadrant 910 of FIG. 9C). To do so, in some embodiments, the wearable computing device 110 increases the display size of each of the plurality of user-selectable icons 122 (e.g., the user-selectable icons 912 of FIG. 9C) in block 808.

In block 810, the wearable computing device 110 determines whether a selection of one of the user-selectable icons 912 (e.g., the user-selectable icon 914 of FIG. 9C) in the selected quadrant (e.g., the quadrant 910 of FIG. 9C) is received. To do so, the wearable computing device 110 determines whether a signal indicative of the user's selection of one of the user-selectable icons 912 (e.g., the selected user-selectable icon 914 of FIG. 9C) is received from the touch sensitive display device 130. If, in block 810, the wearable computing device 110 determines that one of the user-selectable icons 912 (e.g., the selected user-selectable icon 914 of FIG. 9C) is selected, the method 800 advances to block 812. If, however, the wearable computing device 110 determines instead that one of the user-selectable icons 912 (e.g., the selected user-selectable icon 914 of FIG. 9C) is not selected, the method 800 loops back to block 804 to determine whether one of the quadrants (e.g., the quadrants 910, 920, 930, 940) is selected.

Figure 9D:
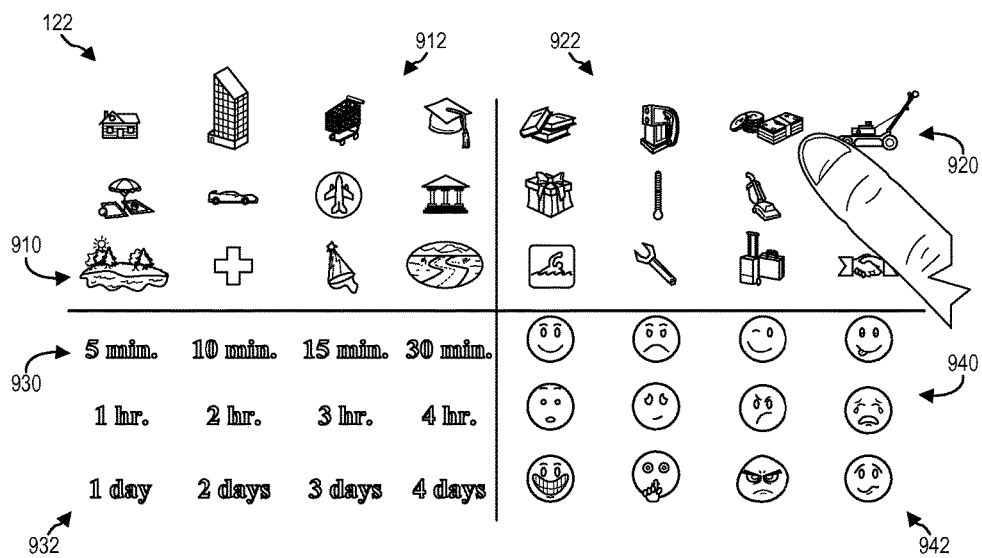

In block 812, the wearable computing device 110 zooms out of the selected quadrant (e.g., the quadrant 910 of FIG. 9D). To do so, in some embodiments, the wearable computing device 110 decreases the display size of each of the plurality of user-selectable icons 122 (e.g., the user-selectable icons 912 of FIG. 9D) in block 814.

In some embodiments, in block 816, the wearable computing device 110 tracks the user's interaction with the selected user-selectable icon 122 (e.g., the selected icon 914). For example, in some embodiments, the wearable computing device 110 may determine whether the user drags the selected user-selectable icon 122 (e.g., the selected icon 914) across the selected quadrant (e.g., the quadrant 910) and/or any other quadrant (e.g., the quadrants 920, 930, 940). It should be appreciated that the wearable computing device 110 may change the size, orientation, and/or manner in which the plurality of user-selectable icons 122 (e.g., the user-selectable icons 912, 922, 932, 942) are displayed based at least in part on, or otherwise as a function of, the user's tracked interaction with the selected user-selectable icon 122 (e.g., the selected icon 914).

In block 818, the wearable computing device 110 determines whether a selection of another one of the quadrants (e.g., the quadrant 920 of FIG. 9D) is received. To do so, the wearable computing device 110 determines whether a signal indicative of the user's selection of the other quadrant (e.g., the quadrant 920 of FIG. 9D) is received from the touch sensitive display device 130. If, in block 818, the wearable computing device 110 determines that the other quadrant (e.g., the quadrant 920 of FIG. 9D) is selected, the method 800 advances to block 820. If, however, the wearable computing device 110 determines instead that the other quadrant (e.g., the quadrant 920 of FIG. 9D) is not selected, the method 800 advances to block 826.

Figure 9E:
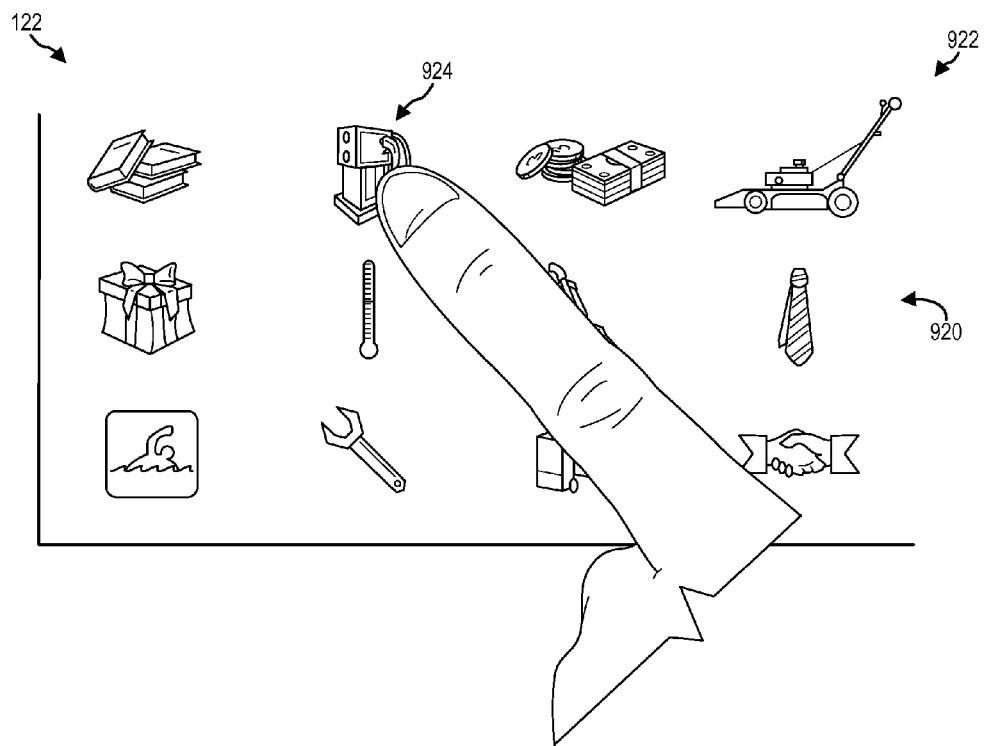

In block 820, the wearable computing device 110 zooms into the selected other quadrant (e.g., the quadrant 920 of FIG. 9E). To do so, in some embodiments, the wearable computing device 110 increases the display size of each of the plurality of user-selectable icons 122 (e.g., the user-selectable icons 922 of FIG. 9E) in block 822.

In block 824, the wearable computing device 110 determines whether a selection of one of the user-selectable icons 922 (e.g., the user-selectable icon 924 of FIG. 9E) in the selected other quadrant (e.g., the quadrant 920 of FIG. 9E) is received. To do so, the wearable computing device 110 determines whether a signal indicative of the user's selection of one of the user-selectable icons 922 (e.g., the selected user-selectable icon 924 of FIG. 9E) is received from the touch sensitive display device 130. If, in block 824, the wearable computing device 110 determines that one of the user-selectable icons 922 (e.g., the selected user-selectable icon 924 of FIG. 9E) is selected, the method 800 advances to block 826. If, however, the wearable computing device 110 determines instead that one of the user-selectable icons 922 (e.g., the selected user-selectable icon 924 of FIG. 9E) is not selected, the method 800 loops back to block 812, in which the wearable computing device 110 zooms out of the selected other quadrant (e.g., the quadrant 920 of FIG. 9A).

In block 826, the wearable computing device 110 generates a text message (e.g., a short message service message, an email message, a web address, a username, a password, a social media post, a social media status update, a chat message, a group text message, etc.) from the selected user-selectable icons 914, 924. In embodiments wherein more than one user-selectable icon is selected by the user, the wearable computing device 110 retrieves the textual meaning associated with each of the selected user-selectable icons 914, 924 from the policy database 126. The wearable computing device 110 then combines (e.g., combines, concatenates, etc.) each of the textual meanings to generate the text message. In embodiments wherein only one user-selectable icon 122 selected by the user (e.g., the selected icon 914 of FIG. 9C), the wearable computing device 110 retrieves the textual meaning associated with that user-selectable icon 122 (e.g., the selected user-selectable icon 914 of FIG. 9C) from the policy database 126 and generates the text message therefrom.

Figure 10:
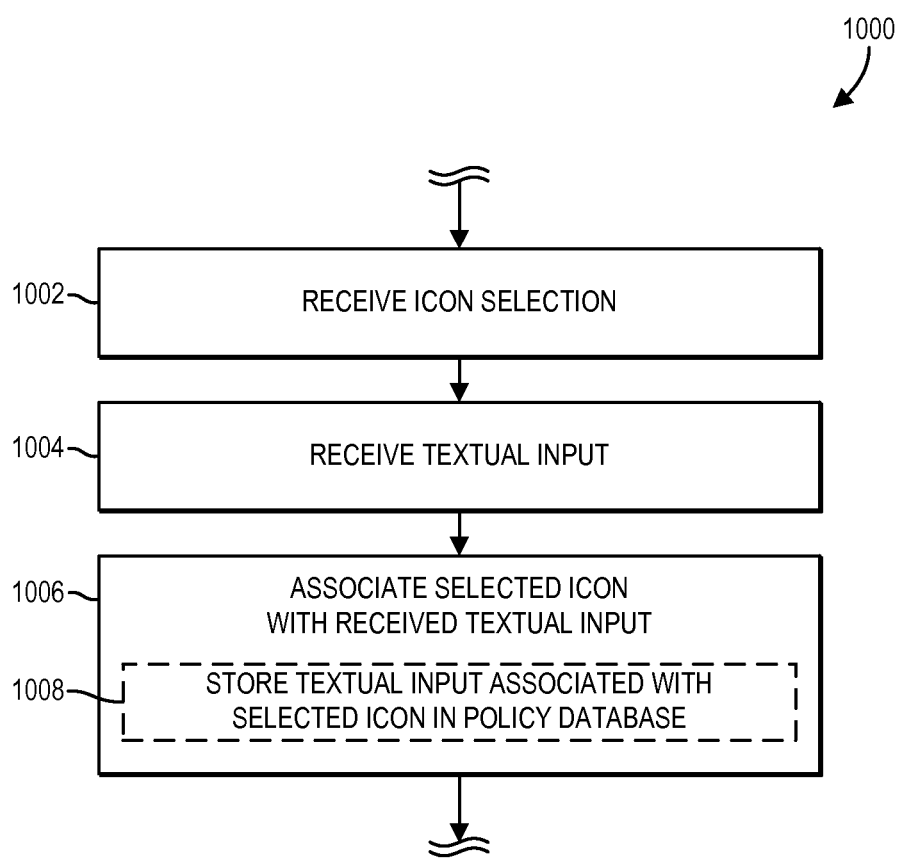
FIG. 10 is a simplified flow diagram of at least one embodiment of a method that may be executed by the wearable computing device of FIG. 1 for associating a received textual meaning with a user-selectable icon.

Referring now to FIG. 10, the wearable computing device 110 may execute a method 1000 for associating a received textual meaning with a user-selectable icon 122. The method 1000 begins with block 1002 in which the wearable computing device 110 receives a selection of a user-selectable icon 122 made by a user. To do so, the wearable computing device 110 receives a signal generated in response to the user's selection of the user-selectable icon 122 via the touch sensitive display device 130. The method 1000 then advances to block 1004.

In block 1004, the wearable computing device 110 receives textual input data indicative of a textual meaning to be associated with the selected user-selectable icon 122. In some embodiments, the wearable computing device 110 receives the textual input data via an interface of the wearable computing device itself 110. Additionally or alternatively, the wearable computing device 110 may also receive the textual input data from another computing device such as, for example, the mobile computing device 150 and/or the cloud server 160.

Subsequently, in block 1006, the wearable computing device 110 associates the received textual input data with the selected user-selectable icon 122. To do so, in block 1008, the wearable computing device 110 may store the received textual input data in the policy database 126 based on the selected user-selectable icon 122. For example, the wearable computing device 110 may associate (e.g., relate, link, map, etc.) the received textual input data with the selected user-selected icon 122 in the policy database 126.

EXAMPLES

Illustrative examples of the technologies disclosed herein are provided below. An embodiment of the technologies may include any one or more, and any combination of, the examples described below.

Example 1 includes a wearable computing device to generate a text message from user-selectable icons, the wearable computing device includes a context determination module to determine a context associated with the wearable computing device; an icon recommendation module to determine one or more user-selectable icons of a plurality of predefined user-selectable icons as a function of the context associated with the wearable computing device, wherein each of the plurality of predefined user-selectable icons has one or more textual meanings associated therewith for text message generation; and an icon display module to display the determined one or more user-selectable icons on a display of the wearable computing device.

Example 2 includes the subject matter of Example 1, and further including at least one context sensor to capture context data indicative of the context of the wearable computing device; and wherein to determine the context associated with the wearable computing device includes to determine the context based on the context data captured by the at least one context sensor.

Example 3 includes the subject matter of any of Examples 1 and 2, and wherein the at least one context sensor includes a location determination module to determine a location of the wearable computing device.

Example 4 includes the subject matter of any of Examples 1-3, and wherein the context determination module is to determine a context of a user of the wearable computing device; and wherein to determine the one or more user-selectable icons includes to determine one or more user-selectable icons as a function of the context of the user.

Example 5 includes the subject matter of any of Examples 1-4, and wherein to determine the context of the user of the wearable computing device includes to: (i) monitor communication messages accessible by the wearable computing device, (ii) analyze the communication messages to determine a probable textual meaning for a user-selectable icon of the plurality of predefined user-selectable icons, and (iii) recommend association of the probable textual meaning with the user-selectable icon.

Example 6 includes the subject matter of any of Examples 1-5, and wherein to determine the context associated with the wearable computing device includes to: (i) determine a context of the wearable computing device, and (ii) determine a context of a user of the wearable computing device; and wherein to determine the one or more user-selectable icons includes to determine one or more user-selectable icons as a function of the context of the wearable computing device and the context of the user.

Example 7 includes the subject matter of any of Examples 1-6, and wherein the context determination module is further to receive context data from a remote computing device, the received context data indicative of the context of a least one of the wearable computing device or a user of the wearable computing device; and wherein the icon recommendation module to determine the one or more user-selectable icons as a function of the received context data.

Example 8 includes the subject matter of any of Examples 1-7, and further including a policy database, the policy database includes one or more rules for the determination of the one or more user-selectable icons as a function of the context of the wearable computing device; and wherein to determine the one or more user-selectable icons includes to compare the context of the wearable computing device to the one or more rules of the policy database.

Example 9 includes the subject matter of any of Examples 1-8, and further including a policy database, the policy database includes probability data computed for each of the one or more user-selectable icons, wherein the probability data is indicative of a probability that a user-selectable icon of the plurality of predefined user-selectable icons will be selected by a user based on one or more reference contexts; and wherein to determine the one or more user-selectable icons includes to (i) compare the determined context associated with the wearable computing device to the one or more reference contexts, and (ii) select the one or more user-selectable icons based on the comparison.

Example 10 includes the subject matter of any of Examples 1-9, and further including a policy database, the policy database includes one or more textual meanings associated with each of the one or more user-selectable icons based on the context of the wearable computing device.

Example 11 includes the subject matter of any of Examples 1-10, and further including an icon selection module to receive a selection of a user-selectable icon displayed on the wearable computing device; retrieve a textual meaning associated with the selected user-selectable icon from the policy database based on the context associated with the wearable computing device; and generate a text message based on the retrieved textual meaning associated with the selected user-selectable icon.

Example 12 includes the subject matter of any of Examples 1-11, and wherein the icon selection module is further to: (i) determine whether another user-selectable icon displayed on the wearable computing device is selected, and (ii) retrieve another textual meaning associated with the another selected user-selectable icon from the policy database based on the context associated with the wearable computing device; and wherein to generate the text message includes to combine the retrieved textual meaning associated with the selected user-selectable icon and the retrieved another textual meaning associated with the another selected user-selectable icon.

Example 13 includes the subject matter of any of Examples 1-12, and wherein the icon selection module is further to determine whether to display one or more user-selectable sub-icons in response to selection of the user-selectable icon; and wherein the icon display module is further to display the one or more user-selectable sub-icons.

Example 14 includes the subject matter of any of Examples 1-13, and further including a communication module to transmit the generated text message to a recipient computing device.

Example 15 includes the subject matter of any of Examples 1-14, and further including an icon selection module to receive a selection of a user-selectable icon displayed on the wearable computing device; receive textual input from the wearable computing device, wherein the textual input is indicative of a textual meaning of the selected user-selectable icon; associate the selected user-selectable icon with the received textual input; and store the textual input associated with the selected user-selectable icon in a policy database, wherein the policy database includes one or more textual meanings associated with each of the one or more user-selectable icons based on the context associated with the wearable computing device.

Example 16 includes the subject matter of any of Examples 1-15, and wherein to display the determined one or more user-selectable icons includes to display the determined one or more user-selectable icons in quadrants on the display of the wearable computing device; wherein the wearable computing device further includes an icon selection module to: (i) receive a selection of a first quadrant, (ii) receive a selection of a first user-selectable icon displayed within the first quadrant, (iii) receive a selection of a second quadrant, (iv) receive a selection of a second user-selectable icon displayed within the second quadrant, and (v) generate a text message based on the first and second user-selectable icons selected from the first and second quadrants; and wherein the icon display module is further to: (i) zoom into the first quadrant in response to selection of the first quadrant, (ii) zoom out of the first quadrant in response to selection of the first user-selectable icon within the first quadrant, and (iii) zoom into the second quadrant in response to selection of the second quadrant.

Example 17 includes the subject matter of any of Examples 1-16, and further including a tactile map defined on the display of the wearable computing device, the tactile map to provide tactile feedback of the location of the determined one or more user-selectable icons displayed on the display.

Example 18 includes the subject matter of any of Examples 1-17, and further including an icon selection module to receive a selection of a user-selectable icon displayed on the wearable computing device; and a feedback device to generate feedback to a user of the wearable computing device based on the selection of the user-selectable icon.

Example 19 includes the subject matter of any of Examples 1-18, and wherein to generate feedback to the user includes to generate tactile feedback to the user of the wearable computing device.

Example 20 includes the subject matter of any of Examples 1-19, and wherein the plurality of predefined user-selectable icons includes a plurality of user-selectable icons stored on the wearable computing device.

Example 21 includes the subject matter of any of Examples 1-20, and wherein the icon recommendation module is to receive a group textual meaning for a predefined user-selectable icon from a recipient computing device, the received group textual meaning for the predefined user-selectable icon is different from the textual meaning associated with the predefined user-selectable icon.

Example 22 includes a method for generating a text message from user-selectable icons, the method includes determining, by a wearable computing device, a context associated with the wearable computing device; determining, by the wearable computing device, one or more user-selectable icons of a plurality of predefined user-selectable icons as a function of the context associated with the wearable computing device, wherein each of the plurality of predefined user-selectable icons having one or more textual meanings associated therewith for text message generation; and displaying, by the wearable computing device, the determined one or more user-selectable icons on a display of the wearable computing device.

Example 23 includes the subject matter of Example 22, and wherein determining the context associated with the wearable computing device includes determining the context associated with the wearable computing device based on context data captured by at least one context sensor of the wearable computing device.

Example 24 includes the subject matter of any of Examples 22 and 23, and wherein the context data captured by the at least one context sensor includes location data associated with the wearable computing device; and wherein the method further includes determining, by the wearable computing device, a location of the wearable computing device as a function of the location data.

Example 25 includes the subject matter of any of Examples 22-24, and further including determining, by the wearable computing device, a context of a user of the wearable computing device; and wherein determining the one or more user-selectable icons includes determining one or more user-selectable icons as a function of the context of the user.

Example 26 includes the subject matter of any of Examples 22-25, and wherein determining the context of the user of the wearable computing device includes: (i) monitoring communication messages accessible by the wearable computing device, (ii) analyzing the communication messages to determine a probable textual meaning for a user-selectable icon of the plurality of predefined user-selectable icons, and (iii) recommending association of the probable textual meaning with the user-selectable icon.

Example 27 includes the subject matter of any of Examples 22-26, and wherein determining the context associated with the wearable computing device includes: (i) determining a context of the wearable computing device, and (ii) determining a context of a user of the wearable computing device; and wherein determining the one or more user-selectable icons includes determining one or more user-selectable icons as a function of the context of the wearable computing device and the context of the user.

Example 28 includes the subject matter of any of Examples 22-27, and further including receiving, by the wearable computing device, context data from a remote computing device, the received context data indicative of the context of a least one of the wearable computing device or a user of the wearable computing device; and wherein determining the one or more user-selectable icons includes determining one or more user-selectable icons as a function of the received context data.

Example 29 includes the subject matter of any of Examples 22-28, and wherein determining the one or more user-selectable icons includes comparing the context of the wearable computing device to one or more rules of a policy database.

Example 30 includes the subject matter of any of Examples 22-29, and wherein determining the one or more user-selectable icons includes: (i) comparing the determined context of the wearable computing device to one or more reference contexts of a policy database, the policy database includes probability data computed for each of the one or more user-selectable icons, wherein the probability data is indicative of a probability that a user-selectable icon of the plurality of predefined user-selectable icons will be selected by a user based on the one or more reference contexts; and (ii) selecting the one or more user-selectable icons based on the comparison.

Example 31 includes the subject matter of any of Examples 22-30, and further including receiving, by the wearable computing device, a selection of a user-selectable icon displayed on the wearable computing device; retrieving, by the wearable computing device, a textual meaning associated with the selected user-selectable icon from a policy database based on the context associated with the wearable computing device, wherein the policy database includes one or more textual meanings associated with each of the one or more user-selectable icons based on the context of the wearable computing device; and generating, by the wearable computing device, a text message based on the retrieved textual meaning associated with the selected user-selectable icon.

Example 32 includes the subject matter of any of Examples 22-31, and further including determining, by the wearable computing device, whether another user-selectable icon displayed on the wearable computing device is selected; retrieving, by the wearable computing device, another textual meaning associated with the another selected user-selectable icon from the policy database based on the context associated with the wearable computing device; and wherein generating the text message includes combining the retrieved textual meaning associated with the selected user-selectable icon and the retrieved another textual meaning associated with the another selected user-selectable icon.

Example 33 includes the subject matter of any of Examples 22-32, and further including determining, by the wearable computing device, whether to display one or more user-selectable sub-icons in response to selection of the user-selectable icon; and displaying, by the wearable computing device, the one or more user-selectable sub-icons.

Example 34 includes the subject matter of any of Examples 22-33, and further including transmitting, by the wearable computing device, the generated text message to a recipient computing device.

Example 35 includes the subject matter of any of Examples 22-34, and further including receiving, by the wearable computing device, a selection of a user-selectable icon displayed on the wearable computing device; receiving, by the wearable computing device, textual input from the wearable computing device indicative of a textual meaning of the selected user-selectable icon; associating, by the wearable computing device, the selected user-selectable icon with the received textual input; and storing, by the wearable computing device, the textual input associated with the selected user-selectable icon in a policy database, wherein the policy database includes one or more textual meanings associated with each of the one or more user-selectable icons based on the context associated with the wearable computing device.

Example 36 includes the subject matter of any of Examples 22-35, and wherein displaying the determined one or more user-selectable icons includes displaying the determined one or more user-selectable icons in quadrants on the display of the wearable computing device; and wherein the method further includes receiving, by the wearable computing device, a selection of a first quadrant; zooming into, by the wearable computing device, the first quadrant in response to selection of the first quadrant; receiving, by the wearable computing device, a selection of a first user-selectable icon displayed within the first quadrant; zooming out of, by the wearable computing device, the first quadrant in response to selection of the first user-selectable icon within the first quadrant; receiving, by the wearable computing device, a selection of a second quadrant; zooming into, by the wearable computing device, the second quadrant in response to selection of the second quadrant; receiving, by the wearable computing device, a selection of a second user-selectable icon displayed within the second quadrant; and generating, by the wearable computing device, a text message based on the first and second user-selectable icons selected from the first and second quadrants.

Example 37 includes the subject matter of any of Examples 22-36, and further including providing, by the wearable computing device, tactile feedback of the location of the determined one or more user-selectable icons displayed on the display of the wearable computing device.

Example 38 includes the subject matter of any of Examples 22-37, and further including receiving, by the wearable computing device, a selection of a user-selectable icon displayed on the wearable computing device; and generating, by the wearable computing device, feedback to a user of the wearable computing device based on the selection of the user-selectable icon.

Example 39 includes the subject matter of any of Examples 22-38, and wherein generating feedback to the user includes generating tactile feedback to the user of the wearable computing device.

Example 40 includes the subject matter of any of Examples 22-39, and wherein the plurality of predefined user-selectable icons includes a plurality of user-selectable icons stored on the wearable computing device.

Example 41 includes the subject matter of any of Examples 22-40, and further including receiving a group textual meaning for a predefined user-selectable icon from a recipient computing device, the received group textual meaning for the predefined user-selectable icon is different from the textual meaning associated with the predefined user-selectable icon.

Example 42 includes a wearable computing device to generate a text message from user-selectable icons, the wearable computing device including a processor; and a memory having stored therein a plurality of instructions that when executed by the processor cause the wearable computing device to perform the method of any of Examples 22-41.

Example 43 includes one or more machine readable media including a plurality of instructions stored thereon that in response to being executed result in a wearable computing device performing the method of any of Examples 22-41.

Example 44 includes a wearable computing device to generate a text message from user-selectable icons, the wearable computing device includes means for performing the method of any of Examples 22-41.

The invention claimed is:

1. A wearable computing device to generate a text message from user-selectable icons, the wearable computing device comprising:
   one or more processors; and
   one or more memory devices having stored therein a plurality of instructions that, when executed by the one or more processors, cause the wearable computing device to:
      determine a context associated with the wearable computing device;
      determine one or more user-selectable icons of a plurality of predefined user-selectable icons, wherein each of the plurality of predefined user-selectable icons has multiple textual meanings associated therewith for text message generation and wherein to determine the one or more user-selectable icons comprises to determine one or more user-selectable icons as a function of (i) the context associated with the wearable computing device and (ii) the multiple textual meanings associated with each user-selectable icon;
      display the determined one or more user-selectable icons on a display of the wearable computing device;
      receive a selection of a user-selectable icon displayed on the wearable computing device for text message generation;
      determine, in response to the selection of the user-selectable icon, whether to display one or more user-selectable sub-icons based on the selected user-selectable icon; and
      display, in response to a determination that the one or more user-selectable sub-icons are to be displayed, the one or more user-selectable sub-icons.

2. The wearable computing device of claim 1, further comprising at least one context sensor to capture context data indicative of the context of the wearable computing device; and
   wherein to determine the context associated with the wearable computing device comprises to determine the context based on the context data captured by the at least one context sensor.

3. The wearable computing device of claim 2, wherein the at least one context sensor comprises a location determination module to determine a location of the wearable computing device.

4. The wearable computing device of claim 1, wherein the plurality of instructions, when executed, further cause the wearable computing device to determine a context of a user of the wearable computing device; and
   wherein to determine the one or more user-selectable icons comprises to determine one or more user-selectable icons as a function of the context of the user.

5. The wearable computing device of claim 4, wherein to determine the context of the user of the wearable computing device comprises to: (i) monitor communication messages accessible by the wearable computing device, (ii) analyze the communication messages to determine a probable textual meaning for a user-selectable icon of the plurality of predefined user-selectable icons, and (iii) recommend association of the probable textual meaning with the user-selectable icon.

6. The wearable computing device of claim 1, wherein to determine the context associated with the wearable computing device comprises to: (i) determine a context of the wearable computing device, and (ii) determine a context of a user of the wearable computing device; and
   wherein to determine the one or more user-selectable icons comprises to determine one or more user-selectable icons as a function of the context of the wearable computing device and the context of the user.

7. The wearable computing device of claim 1, wherein the plurality of instructions, when executed, further cause the wearable computing device to receive context data from a remote computing device, the received context data indicative of the context of a least one of the wearable computing device or a user of the wearable computing device; and
   wherein the icon recommendation module to determine the one or more user-selectable icons as a function of the received context data.

8. The wearable computing device of claim 1, further comprising a policy database, the policy database comprises one or more rules for the determination of the one or more user-selectable icons as a function of the context of the wearable computing device; and
   wherein to determine the one or more user-selectable icons comprises to compare the context of the wearable computing device to the one or more rules of the policy database.

9. The wearable computing device of claim 1, further comprising a policy database, the policy database comprises probability data computed for each of the one or more user-selectable icons, wherein the probability data is indicative of a probability that a user-selectable icon of the plurality of predefined user-selectable icons will be selected by a user based on one or more reference contexts; and
   wherein to determine the one or more user-selectable icons comprises to (i) compare the determined context associated with the wearable computing device to the one or more reference contexts, and (ii) select the one or more user-selectable icons based on the comparison.

10. The wearable computing device of claim 1, further comprising a policy database, wherein the policy database comprises one or more textual meanings associated with each of the one or more user-selectable icons based on the context of the wearable computing device; and wherein the plurality of instructions, when executed, further cause the wearable computing device to: (i) retrieve, in response to a receipt of the selected user-selectable icon, a textual meaning associated with the selected user-selectable icon from the policy database based on the context associated with the wearable computing device, and (ii) generate a text message based on the retrieved textual meaning associated with the selected user-selectable icon.

11. The wearable computing device of claim 10, wherein the plurality of instructions, when executed, further cause the wearable computing device to: (i) determine whether another user-selectable icon displayed on the wearable computing device is selected, and (ii) retrieve another textual meaning associated with the another selected user-selectable icon from the policy database based on the context associated with the wearable computing device; and wherein to generate the text message comprises to combine the retrieved textual meaning associated with the selected user-selectable icon and the retrieved another textual meaning associated with the another selected user-selectable icon.

12. The wearable computing device of claim 1, wherein the plurality of instructions, when executed, further cause the wearable computing device to:

receive, in response to the selection of the user-selectable icon, textual input from the wearable computing device, wherein the textual input is indicative of a textual meaning of the selected user-selectable icon;

associate the selected user-selectable icon with the received textual input; and store the textual input associated with the selected user-selectable icon in a policy database, wherein the policy database comprises one or more textual meanings associated with each of the one or more user-selectable icons based on the context associated with the wearable computing device.

13. The wearable computing device of claim 1, further comprising a tactile map defined on the display of the wearable computing device, the tactile map to provide tactile feedback of the location of the determined one or more user-selectable icons displayed on the display.

14. The wearable computing device of claim 1, the plurality of instructions, when executed, further cause the wearable computing device to:

generate, in response to a receipt of the selected user-selectable icon, feedback to a user of the wearable computing device based on the selection of the user-selectable icon.

15. The wearable computing device of claim 1, wherein the plurality of predefined user-selectable icons comprises a plurality of user-selectable icons stored on the wearable computing device.

16. The wearable computing device of claim 1, wherein the plurality of instructions, when executed, further cause the wearable computing device receive a group textual meaning for a predefined user-selectable icon from a recipient computing device, the received group textual meaning for the predefined user-selectable icon is different from the textual meaning associated with the predefined user-selectable icon.

17. One or more non-transitory, machine readable media comprising a plurality of instructions stored thereon that in response to being executed by a wearable computing device, cause the wearable computing device to:

determine a context associated with the wearable computing device;

determine one or more user-selectable icons of a plurality of predefined user-selectable icons, wherein each of the plurality of predefined user-selectable icons has multiple textual meanings associated therewith for text message generation and wherein to determine the one or more user-selectable icons comprises to determine one or more user-selectable icons as a function of (i) the context associated with the wearable computing device and (ii) the multiple textual meanings associated with each user-selectable icon;

display the determined one or more user-selectable icons on a display of the wearable computing device;

receive a selection of a user-selectable icon displayed on the wearable computing device for text message generation;

determine, in response to a selection of the user-selectable icon, whether to display one or more user-selectable sub-icons based on the selected user-selectable icon; and display, in response to a determination that the one or more user-selectable sub-icons are to be displayed, the one or more user-selectable sub-icons.

18. The one or more non-transitory, machine readable media of claim 17, wherein to determine the context associated with the wearable computing device comprises to determine the context associated with the wearable computing device based on context data captured by at least one context sensor of the wearable computing device.

19. The one or more non-transitory, machine readable media of claim 17, wherein the plurality of instructions further cause the wearable computing device to determine a context of a user of the wearable computing device; and wherein to determine the one or more user-selectable icons comprises to determine one or more user-selectable icons as a function of the context of the user.

20. The one or more non-transitory, machine readable media of claim 17, wherein the plurality of instructions further cause the wearable computing device to:

retrieve, in response to a receipt of the selected user-selectable icon, a textual meaning associated with the selected user-selectable icon from a policy database based on the context associated with the wearable computing device, wherein the policy database comprises one or more textual meanings associated with each of the one or more user-selectable icons based on the context of the wearable computing device; and generate a text message based on the retrieved textual meaning associated with the selected user-selectable icon.

21. The one or more non-transitory, machine readable media of claim 20, wherein the plurality of instructions further cause the wearable computing device to:

determine whether another user-selectable icon displayed on the wearable computing device is selected;

retrieve another textual meaning associated with the another selected user-selectable icon from the policy database based on the context associated with the wearable computing device; and wherein to generate the text message comprises to combine the retrieved textual meaning associated with the selected user-selectable icon and the retrieved another textual meaning associated with the another selected user-selectable icon.

22. The one or more non-transitory, machine readable media of claim 17, wherein the plurality of instructions further cause the wearable computing device to:
receive, in response to a receipt of the selected user-selectable icon, textual input from the wearable computing device, wherein the textual input is indicative of a textual meaning of the selected user-selectable icon;
associate the selected user-selectable icon with the received textual input; and
store the textual input associated with the selected user-selectable icon in a policy database, wherein the policy database comprises one or more textual meanings associated with each of the one or more user-selectable icons based on the context associated with the wearable computing device.

\* \* \* \* \*